United States Patent [19]
Padden

[11] Patent Number: 5,594,597
[45] Date of Patent: Jan. 14, 1997

[54] NEURAL NETWORK DISK DRIVE READ CHANNEL PATTERN DETECTOR

[75] Inventor: Robin Padden, Roy, Utah

[73] Assignee: Iomega Corporation, Roy, Utah

[21] Appl. No.: 235,124

[22] Filed: Apr. 28, 1994

Related U.S. Application Data

[63] Continuation of Ser. No. 786,274, Nov. 1, 1991, abandoned.
[51] Int. Cl.⁶ ............................... G11B 5/09; G06E 1/00
[52] U.S. Cl. ............................... 360/46; 360/45; 360/67; 360/65; 395/22
[58] Field of Search ............................... 360/46, 45, 67, 360/65; 395/22

[56] References Cited

U.S. PATENT DOCUMENTS

| | | | |
|---|---|---|---|
| 3,930,265 | 12/1975 | Kimura | 360/45 |
| 4,772,964 | 9/1988 | Kaida | 360/67 |
| 4,906,940 | 3/1990 | Green et al. | 382/16 |
| 4,987,500 | 1/1991 | Bizjak et al. | 360/46 |
| 5,003,490 | 3/1991 | Castelaz et al. | 364/513 |
| 5,052,043 | 9/1991 | Gaborski | 382/14 |
| 5,105,316 | 4/1992 | Cronch et al. | 360/46 |
| 5,107,378 | 4/1992 | Cronch et al. | 360/45 |

OTHER PUBLICATIONS

Wood, R., "Magnetic and Optical Storage Systems: Opportunities for Communication Technology," IEEE Intl. Conf. on Communications, Jun. 1989, 1605–1612.

Cioffi et al., "Adaptive Equilization in Magnetic–Disk Storage Channels", IEEE Communications Magazine, Feb. 1990, 14–29.

Abbott et al., "A High–Speed Adaptive Equalizer for Magnetic Disk Drives," 1990 Intl. Conf. on Acoustics, Speech and Signal Processing, Apr. 1990, 929–932.

Gibson et al., "The Application of Nonlinear Structures to the Reconstruction of Binary Signals," IEEE Trans. on Signal Processing, Aug. 1991, 1877–1884.

Rumelhart et al., "Learning Internal Representations by Error Propagation", from Parallel Distributed Processing vol. 1, 1986 pp. 320–362.

Data sheet for the Intel Corporation, 80170NX, "Electronically Trainable Analog Neural Network", (Experimental), Intel Order No. 290408–002, 1989.

Madeline Rule II, by Winter & Widrow, pp. I–401 through I–408, IEEE Intl. Conf. on Neural Networks, Jul. 1988.

*Primary Examiner*—Robert W. Downs
*Assistant Examiner*—A. Katbab
*Attorney, Agent, or Firm*—Woodcock Washburn Kurtz Mackiewicz & Norris

[57] ABSTRACT

A magnetic data recording system includes an electronically trainable neural network in the read channel. The neural network recognizes reproduced patterns of data bits regardless of distortion introduced by the recording and reproduction process. An electronically trainable analog neural network has weights which are set so that the network recognizes a limited number of bit patterns which are stored on a magnetic disk.

14 Claims, 19 Drawing Sheets

| | SUB SECTOR | | | | | | | | | | | | | | | | |
|---|---|---|---|---|---|---|---|---|---|---|---|---|---|---|---|---|---|
| | 0 | 1 | 2 | 3 | 4 | 5 | 6 | 7 | 8 | 9 | A | B | C | D | E | F | |
| 0 | 0 | | | | | | | 1 | | | | | | | | 0 | ⎫ |
| 1 | | | | | | | | | 1 | | | | | | | | |
| 2 | | | | | | 1 | | | | | | | | | | | |
| 3 | | | | | | | | 1 | | | | | | | | | ⎬ 1 |
| 4 | | | | | 1 | | | | | | | | | | | | |
| 5 | | | | | | | | | | | | 1 | | | | | |
| 6 | | | | 1 | | | | | | | | | | | | | |
| 7 | | | | | | | | | | 1 | | | | | | | ⎫ |
| 8 | | | | 1 | | | | | | | | | 1 | | | | |
| 9 | | | | 1 | | | | | | | 1 | | | | | | |
| 10 | | | | 1 | | | | 1 | | | | | | | | | |
| 11 | | | | 1 | | | 1 | | | | | | | | | | |
| 12 | | | | 1 | | 1 | | | | | | | | | | | |
| 13 | | | | | | | | 1 | | | | | 1 | | | | |
| 14 | | | | | | | 1 | | | | | | 1 | | | | ⎬ 2 |
| 15 | | | | | | | | 1 | | | | | 1 | | | | |
| 16 | | | | | | | | | 1 | | | | 1 | | | | |
| 17 | | | | | | 1 | | | | | 1 | | | | | | |
| 18 | | | | | | 1 | | | | | | | 1 | | | | |
| 19 | | | | | | 1 | | | | | | | 1 | | | | |
| 20 | | | 1 | | | | 1 | | | | | 1 | | | | | ⎫ |
| 21 | | 1 | | | | | | | 1 | | | | | 1 | | | |
| 22 | | 1 | | | | | | | 1 | | | | | 1 | | | |
| 23 | | 1 | | | 1 | | | | | | | | | 1 | | | |
| 24 | | | | | | | 1 | | | 1 | | | | 1 | | | ⎬ 3 |
| 25 | | | | 1 | | | 1 | | | 1 | | | | | | | |
| 26 | | | | | | | | | | | | | | | | | |
| 27 | | | 1 | | | 0 | 1 | | | | | | | 1 | | | |
| 28 | | | | | 1 | | | 1 | | | | | | 1 | | | |
| 29 | | | | | 1 | | | | | 1 | | | | 1 | | | |
| 30 | | | 1 | | 1 | | | | | | | | 1 | 1 | | | ⎫ 4 |
| 31 | 0 | | 1 | 0 | | | 1 | 0 | | | 1 | | | | 1 | 0 | |

FIG. 13

NEURAL NETWORK DISK DRIVE READ CHANNEL PATTERN DETECTOR

This is a continuation of application Ser. No. 786,274, filed Nov. 1, 1991, now abandoned.

BACKGROUND OF THE INVENTION

This invention relates to detecting data bit patterns reproduced from a magnetic storage medium and more particularly, to a neural network in the read channel of a magnetic disk drive.

Conventional pulse detectors used in disk drives convert the pre-amplified and equalized analog read head pulses into digital pulses. Two criteria are applied. The first criterion is that the individual pulse be above a certain amplitude, the "gating threshold". This is intended to avoid detection of lower level noise pulses. Once the first criterion is satisfied, the second criterion is that the first derivative of the pre-amplified and equalized analog read head pulses passes through zero, i.e., detection is at the actual peak of the signal.

If the pulses are crowded together to achieve higher density they mutually interfere with neighboring pulses. The gating threshold criterion may not be satisfied. This threshold must be lowered to the "new" threshold. However, this has the undesirable characteristic of being closer to the noise so that noise rejection suffers. In addition, the peaks of the pulses are pushed away from each other, making their detected position incorrect. Further, the nonlinearities inherent in the recording and playback process at points of high mutual pulse interference, called "intersymbol interference" or "ISI", cannot be compensated for by a linear equalizer. The purpose of the equalizer is to provide the corrective frequency response to cause closely-spaced pulses to be amplified more than widely spaced pulses. Linear equalizers can only correct for linear interference of pulses, not non-linear interferences. Such linear equalizers inherently emphasize higher frequency components, causing a degradation of the wideband signal-to-noise ratio, or "SNR".

Artificial neural systems (ANS) automatically learn to recognize categories of features based on experience. The approach is based on the simulation of biological systems of nerve cells. Each cell is called a "neuron" and systems of neurons are called "neural systems" or "neural networks". Neural networks are often simulated using large systems of ordinary differential equations where the response of a single neuron to inputs is governed by a single differential equation. See U.S. Pat. No. 4,906,940.

Algorithms for "training" these neural networks are well known and include the MADELINE and the back propagation procedures. See, for example, IEEE International Conference on Neural Networks, Sheraton Harbor Island, San Diego, CALIF. July, 24–27, 1988, MADELINE RULE II, by Winter & Widrow, pp. I-401 through I-408 and BASIC MECHANISMS, pp. 320–362.

Recently, electronically trainable analog neural networks have become available. See the data sheet for the Intel Corporation, 80170NX, "Electronically Trainable Analog Neural Network", (Experimental), Intel Order No. 290408-002.

It is an object of the present invention to use a neural network to recognize data bit patterns in the read channel of a magnetic disk or tape drive, when data is written at previously unachievably high densities along a track, exacerbating Intersymbol Interference and non-linear effects.

SUMMARY OF THE INVENTION

In accordance with the present invention, a neural network is used to recognize data bit patterns reproduced from a magnetic disk or a magnetic tape drive.

The neural network is trained to reconstruct a given digital pattern from an analog read signal that is highly distorted due to a large amount of ISI. The neural network distinguishes between different distorted analog read signals. Due to its ability to be trained arbitrarily, the neural network handles non-linearities quite well. Because it does not use a gating threshold in recognizing patterns, it is not as vulnerable as the conventional pulse detectors to the lower amplitudes obtained from large amounts of ISI. The neural network is also trained to be indifferent to effects of noise such as adjacent track pulses and amplifier noise. Because of these advantages, the read channel has the capability to read pulses at higher crowding and ISI than conventional pulse detectors. This results in a higher storage capacity for the disk or tape drive.

An important advantage of the invention is that the neural network can be retrained as new heads or media are introduced.

The foregoing and other objects, features and advantages of the invention will be better understood from the following more detailed description and appended claims.

SHORT DESCRIPTION OF THE DRAWINGS

FIG. 13 shows an encoding table, five bits input to sixteen bits output for the bit patterns of the present invention;

DETAILED DESCRIPTION OF ONE EMBODIMENT OF THE INVENTION

Figure 1:
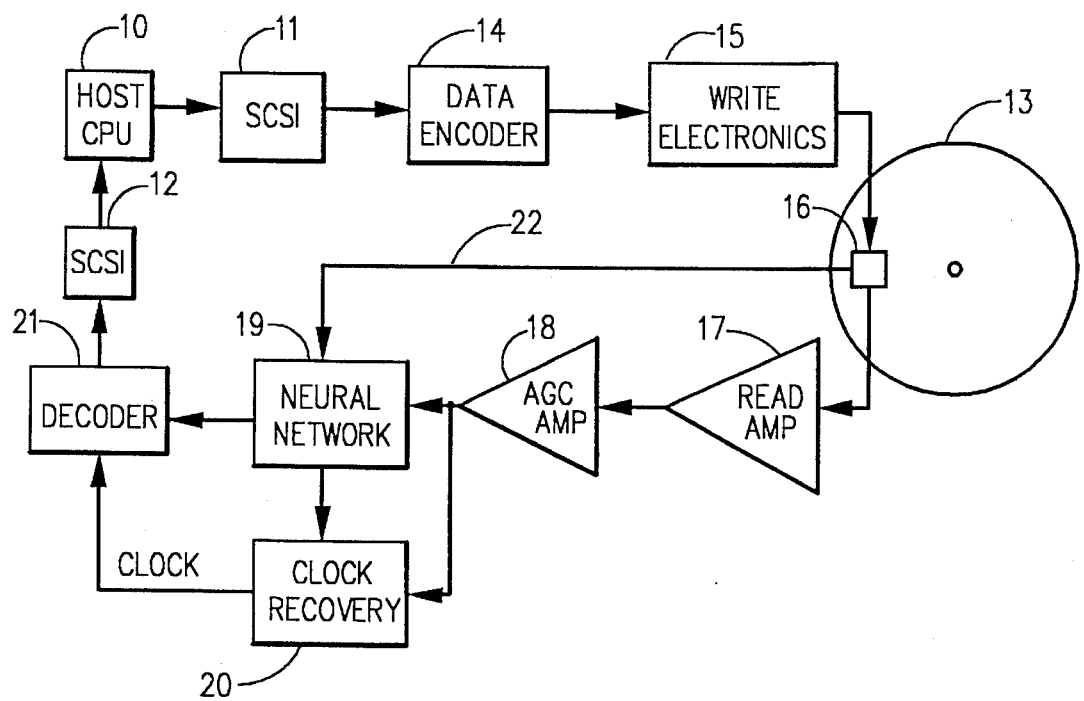
FIG. 1 is a block diagram depicting the invention.

The present invention is used in a typical computer system which includes a host CPU 10 connected through small computer system interfaces (SCSI) 11 and 12 to a magnetic disk drive 13. Data to be recorded is encoded by the encoder 14 into a pattern of data bits by the data encoder 14. Write electronics 15 record this pattern of data bits on magnetic disk 13. Read/write head 16 reproduces a pattern of data bits applied to the read channel of the disk drive. This typically includes a read amplifier 17 and an AGC amplifier 18.

In accordance with the present invention, a neural network 19 converts the analog read signal into the pattern of data bits which has been recorded.

Clock recovery 20 may be the usual phase lock loop, or the clock recovery may be performed by the neural network. The clock pulses strobe the data pulses into decoder 21 which performs error correction on the digital data stream.

The neural network 19 requires that the analog read signal be at a uniform amplitude because it is amplitude sensitive. This normally requires the presence of the AGC amp 18, but it is possible to enhance the neural network to take into account differing amplitudes, thereby eliminating the AGC amplifier.

The neural network 19 is trained to recognize particular data bit patterns which have been recorded. As will be described, the neural network 19 is set with weights when the disk system is built at the factory. These weights enable the neural network to recognize a limited number of bit patterns regardless of noise or distortion introduced by the recording and reproduction of the bit patterns.

Alternatively, "on the fly" training of the neural network is accomplished by including a training sequence in the magnetic disk 13. The neural network is trained by performing a read of an a priori known training sequence. The error between what was actually read and this known sequence is the error used to train the network "on the fly", as indicated by the line 22 from the read/write head 16 to the neural network 19. Preferably, a ROM-stored "known" signal is used for "on-the-fly" training.

The system of the present invention is described in more detail below. Before the description of the detailed circuitry, a discussion of the background and the basic operating principles of one specific electronically trainable analog neural network is presented.

GENERAL BACKGROUND

Figure 2:
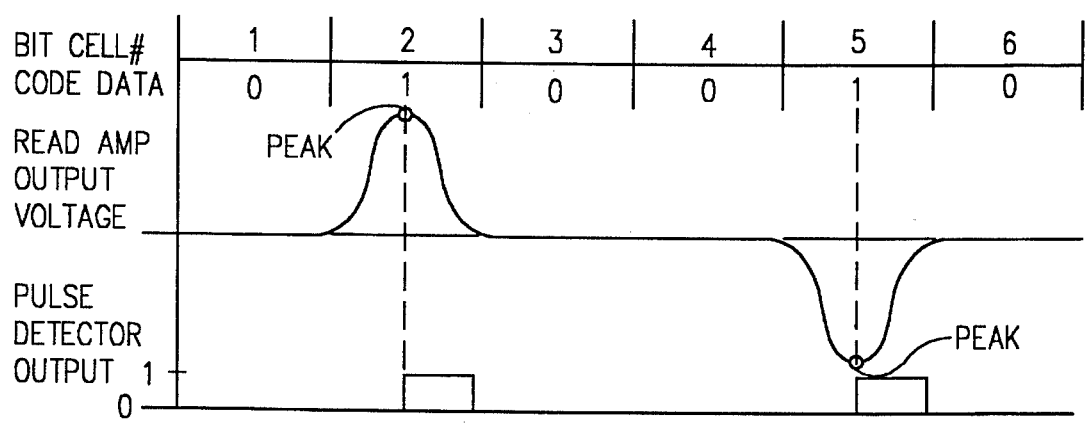
FIGS. 2–5 are waveforms depicting read head/analog waveforms incident to bit pattern detection.

Present disk drive read channels work by detecting the location of the peaks of the waveform read from a disk drive read head and amplified by a read amplifier. FIG. 2 shows the preamp output signal corresponding to a code data pattern of 010010. Here, the signals are easy for the detector to detect; the peaks are far enough apart that they do not interfere with one another. The presence of a detected peak in a bit cell indicates a "1" in that cell; no peak detected indicates a "0".

Figure 3:
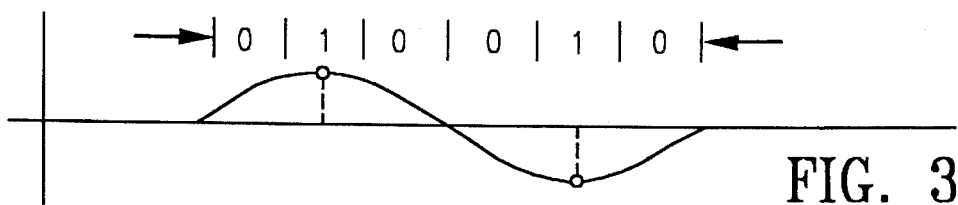

Assume that the same data pattern is to be recorded, but with the pattern 010010 taking up less space on the disk. The same code data pattern would be recorded with the two peaks closer together. See FIG. 3. The pulse amplitudes have been reduced due to their mutual interference.

Figure 4:
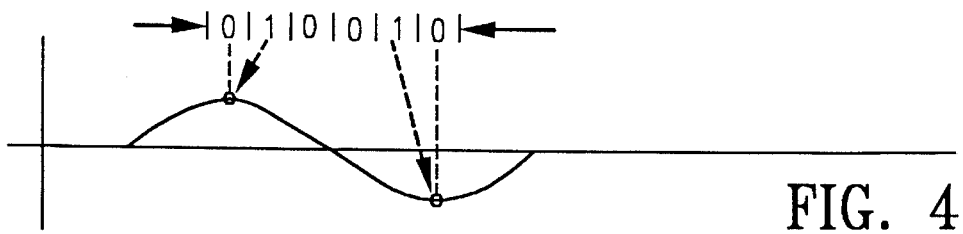

In FIG. 4, the pulses have been squeezed even closer together. The waveform is distorted relative to the FIG. 2 case.

The peak positions have moved away from the centers of the bit cells containing the "1"'s. This case would cause problems for a peak-detecting read channel as the location of the peak could be pushed into an adjoining bit cell and be detected there. In FIG. 4, the detected data pattern might be 100001, not 010010.

One very prominent strength of a neural network is its ability to learn to recognize the presence of a specific pattern at its input. That is, it can be trained to tell that the distorted pattern of FIG. 4 is really 010010, given the distortion. Thus, we can have distorted patterns be properly decoded with the neural network, but not with the present way of implementing peak detecting read channels.

This is the basis of the neural network. The bit cells can be packed so close together that they interfere severely with each other, even in a non-linear way such that strict linear super-position does not hold. The neural network will still be able to "pattern recognize" what the intended pattern is. Linear filtering cannot fully undo the non-linear way that the neighboring pulses interfere with each other.

One way that conventional linear filters work is to emphasize high frequency components of the read waveform that have been lost in the process of reading the pulses with the read head. These high frequencies will be effectively "lost" by the read head because it has a spatio-temporal impulse response that is considerably broader (slower) than the pulse that was originally written to the disk. The ideal linear equalizer filter would have the inverse of this loss function. However, in emphasizing (boosting) the high frequency components, noise is also emphasized. While aiding the reconstruction of the original waveshape, this boost to high frequencies also boosts noise. The noise presents difficulties in both peak detection and peak position detection. Also, because such pulse-to-pulse interference is a non-linear process, such a linear equalizing filter cannot fully compensate for the distortion observed.

Not only does the neural network not noise-enhance the signal, it can be trained to not respond to incidental noise pulses or waveforms.

The advantages asserted for the neural network approach relative to current peak pulse detecting read channels are:

1. Robustness with respect to peak shift.
2. Robustness with respect to non-linear pulse-to-pulse interference.
3. The lack of noise-enhancing equalizing filtering processes.
4. Trained robustness to noise.
5. The pulses can be packed closer together and still be recognizable via pattern recognition.

OPERATION OF A SPECIFIC ELECTRONICALLY TRAINABLE ANALOG NEURAL NETWORK

The following is more specifically described in the data sheet for the Intel Corporation 80170NX Electronically Trainable Analog Neural Network (Experimental) data sheet. (Intel Order Number 290408-002). This device is referred to as an "ETANN".

Figure 5:
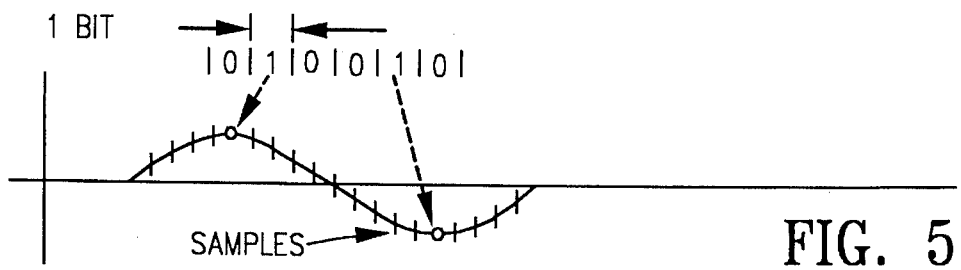

FIG. 5 shows the FIG. 4 waveform sampled twice (little vertical lines on the waveform) in each bit cell. (The little circles show where the peaks would show up to a conventional peak detector).

Figure 6:
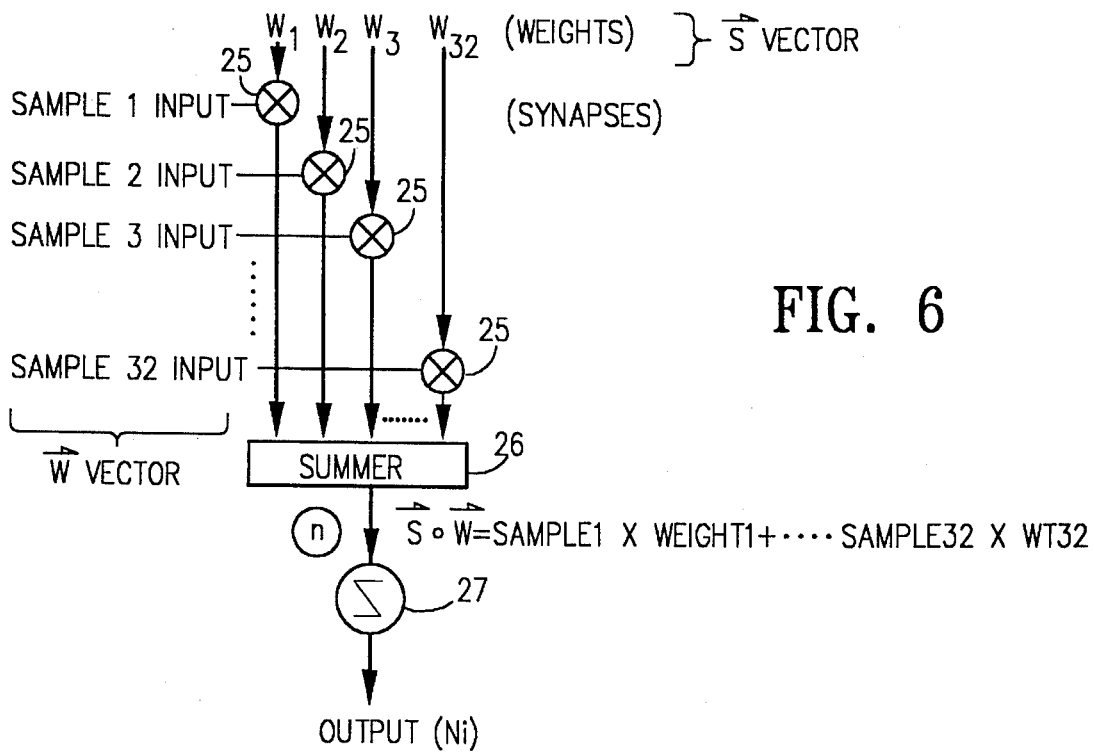
FIG. 6 shows one neuron of a simple neural network.

FIG. 6 shows the basis for the pattern recognition. The consecutive samples numbered 1, 2, . . . 32 are obtained and stored. Assume that 32 such samples have been obtained and stored. For this introduction, assume that the neural network has only one output, which is intended to be a logical "1" if this pattern is presented and a logical "0" if it is not the one presented. This single output is computed by computing the cross-correlation of the input waveform with a stored waveform that matches. The output is:

(sample 1)*(weight 1)+ . . . +(sample 32)*(weight 32)*=$S \cdot W$

Where $S \cdot W$ denotes the dot product of the sample vector with a stored weight vector. In FIG. 6, the samples are multiplied by the weights in the multiplier 25 and the products are summed at 26.

The cross-correlation of the input samples with the weights is equivalent to taking the dot product of the input samples, considered as a vector whose components are the individual samples, "dotted" with the weights, considered as a vector whose components are the individual weights. A dot product is the product of the lengths of the vectors in the product with the cosine of the angle between them. When the vectors line up, i.e., when there is a pattern match, the cosine will be 1 and the dot product will be the product of the two vector lengths. If the vectors are perpendicular, the cosine of 90° would be zero, i.e., when there is not a pattern match. The exceeding of a threshold is detected by the sigmoid neuron 27. The threshold is used to distinguish between a match and a no match and to provide a "crisp" decision as a logical "1" or "0". This is how the neural network recognizes patterns.

Figure 7:
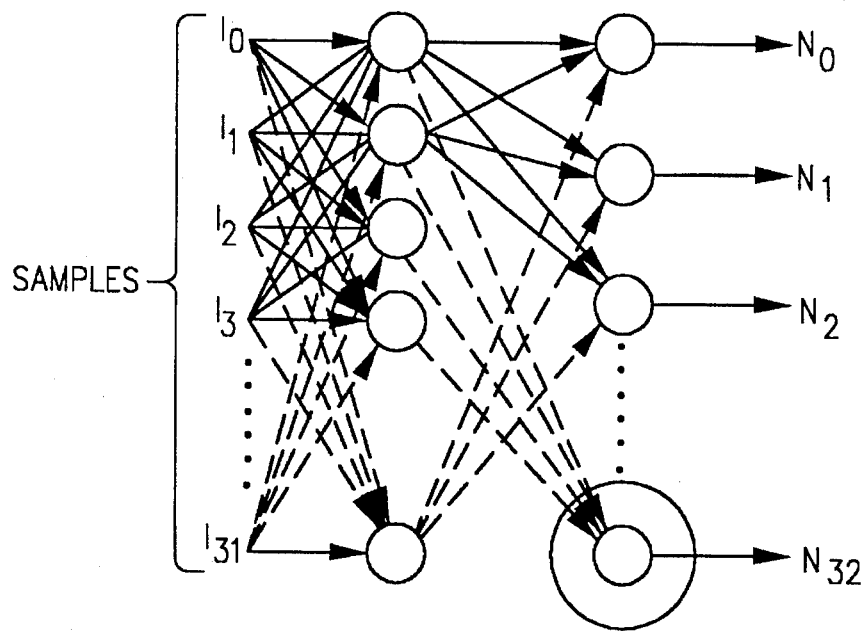
FIG. 7 shows a two layer neural network.

This basic neural network is of limited power, however. Only one pattern can be recognized, and that pattern is uniquely specified. More power can be added by adding more neurons, and synapses (weights) that connect all inputs to all weights, biases and layers, as in FIG. 7. FIG. 7 shows a 2 layer, fully connected, 32 input, 32 neuron output neural network. There are considerably more weights than inputs or outputs. If we consider the neural network synapses as the degrees of freedom available to solve the problem of mapping the given 32 component input vector to the given 32 component output vector, then this problem has many solutions, not just one. (It would have one if there were $32^2=$ 1024 weights; in this example, there are $2 \times 32^2 = 2048$). This "overspecifying" is what lends the neural network its power to come up with more than one solution to a problem. Further, because the computations are done in parallel in time, in an analog manner, a much faster throughput is achievable with the ETANN than with digital implementations that perform ambitious digital flash multiplications.

The weights may be solved iteratively, not analytically, by one of several methods, such as "back-propagation", "Madaline Rule", etc which are known to converge.

Figure 8:
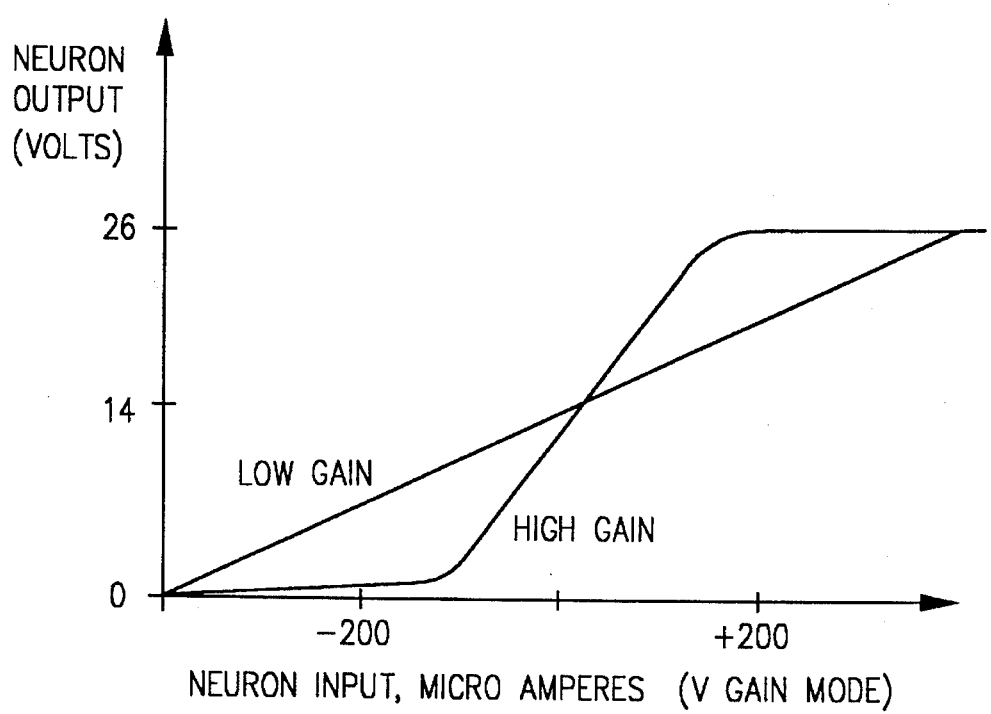
FIGS. 8 and 9 are input/output transfer functions, showing neuron output voltage as a function of neuron input current for different gains.
Figure 9:
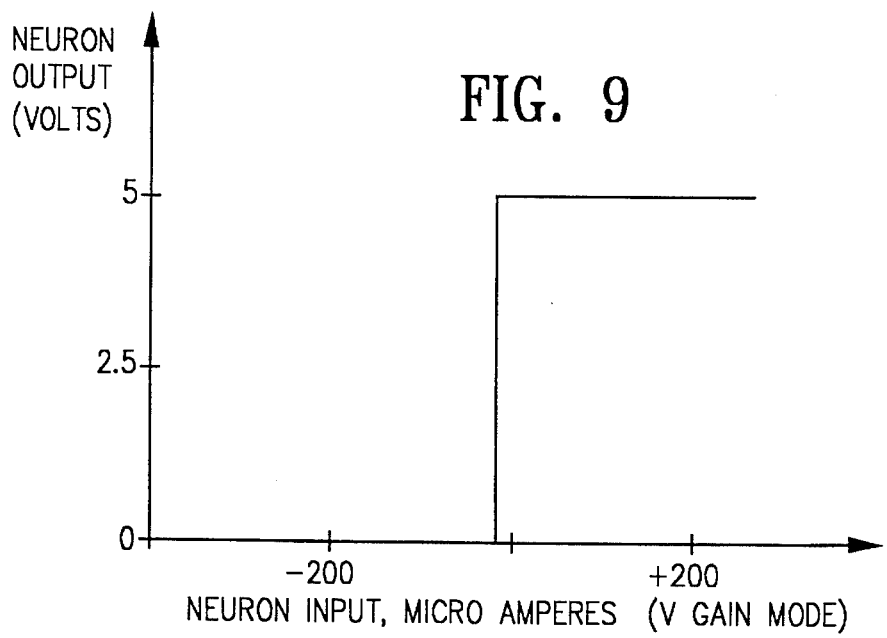

The ETANN has 64 analog signal inputs, I0 through I63. Refer to FIG. 6 of the data sheet for the Intel ETANN referred to above. Each such input can range in voltage from 0 to 2.8 volts and still have reasonably good linearity into the neurons. It is necessary to provide a reference for these inputs to define "zero" signal; this is done by inputting a DC value of 1.4 volts to the ETANN's VREFI pin. The VREFI pin voltage defines the analog input zero voltage. Similarly, the output pins of the neurons, N0–N63, have their zero references set by VREFO. The VGAIN pin sets the gain of the neurons. See FIG. 8. In the VGAIN mode with a low gain (VGAIN–0 V), the gain curve is a gradual slope. With a high gain (VGAIN=1.5 V), the gain curve has a steeper slope. There is another mode, the Hgain mode, in which the transfer is a crisp comparator type. The Hgain mode is chosen by bringing the Hgain pin to +5 V. See FIG. 9.

The ETANN can be put into one of several configurations. The simplest is the Simple Static Feedforward mode. In this mode, a single layer of neurons is used and the analog inputs are simply held at the I0–I63 inputs. These inputs are processed by weights (synapses), summers, and neurons and propagate through the network to the outputs in a processing delay of 1.5 uS. See FIG. 6 of the aforementioned Intel data sheet. In the ETANN there are two arrays of neurons, the input and feedback arrays. In this configuration, the feedback array is held at a reset condition, which means that its contribution to the neuron inputs from the input array is zero.

In FIG. 6B of the data sheet, the feedback array is used to provide 64 more inputs for a total of 128 input dimensions. First, the first 64 inputs are fed to both arrays via the I0–I63 input pins. The input array is then held with the first set of 64 inputs via a sample/hold while the second set of 64 inputs is presented to the feedback array. With the held first set and the now presented inputs all feeding the network, the two sets of 64 inputs will be determining the neuron inputs as if the total capacity of the network is 128 inputs. The HOLD pin serves to hold the inputs to the first array.

Figure 10A:
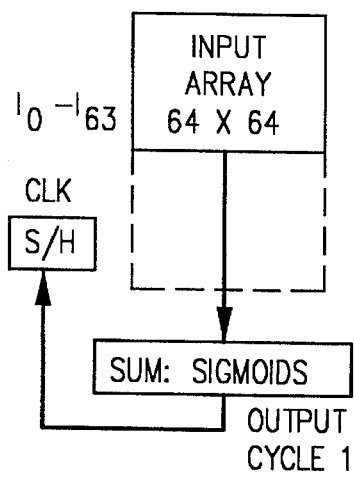
FIGS. 10A–10C show the configuration of the electronically trainable analog neural network used in implementing the present invention.
Figure 10B:
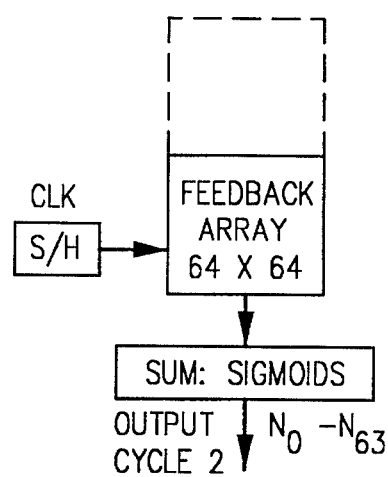
Figure 10C:
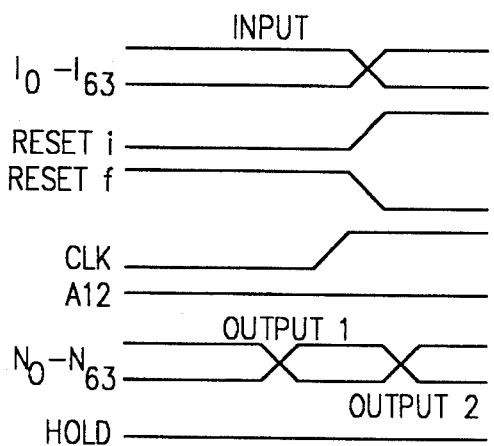

FIGS. 10A–10C show the configuration of the Intel ETANN which is used in the present invention. Initially, the 64 inputs are fed into the input array. With the RESETi pin at 0 and the RESETf pin at 1, the input array will be enabled and the contribution of the feedback array will be set to 0. At this point, bringing the CLK pin low to high will cause the neuron outputs from the input array to be held. Immediately following this, the contribution of the input array is set to 0 and the feedback array is enabled by bringing RESETi to a 1 and RESETf to a 0. Now, the neuron outputs from the previous set are fed to a second layer (the feedback array). After a second processing delay, the output is ready at the N0–N63 output pins.

Other configurations possible with only a change in the timing of the RESETi, RESETf, CLK, HOLD, A12 and NE# pins are:

1. The Hopfield configuration shown in FIG. 7B.
2. The sequence recognition mode shown in FIG. 8A which recognizes the occurrence of one pattern followed by a second.
3. The generation of a sequence, shown in FIG. 8B of the data sheet.
4. A method of being able to handle 128 inputs with two layers, but not with the 64 neurons' outputs available for both layers shown in FIG. 9 of the data sheet.

The programming of the neuron weights will remain if the power is turned off, much like an EEPROM would be. This programming is done using the SYNO, WT, BIAS, SMO+/−, NMO, VPP1, VPP2, LRN, WC and SSYN pins in conjunction with the A23–A0 (address) and N63–N0 (neuron output) pins. As mentioned above, the training may be accomplished via the "back-propagation", "MADALINE" or other algorithm.

OPERATION OF THE PREFERRED EMBODIMENT

Figure 11A:
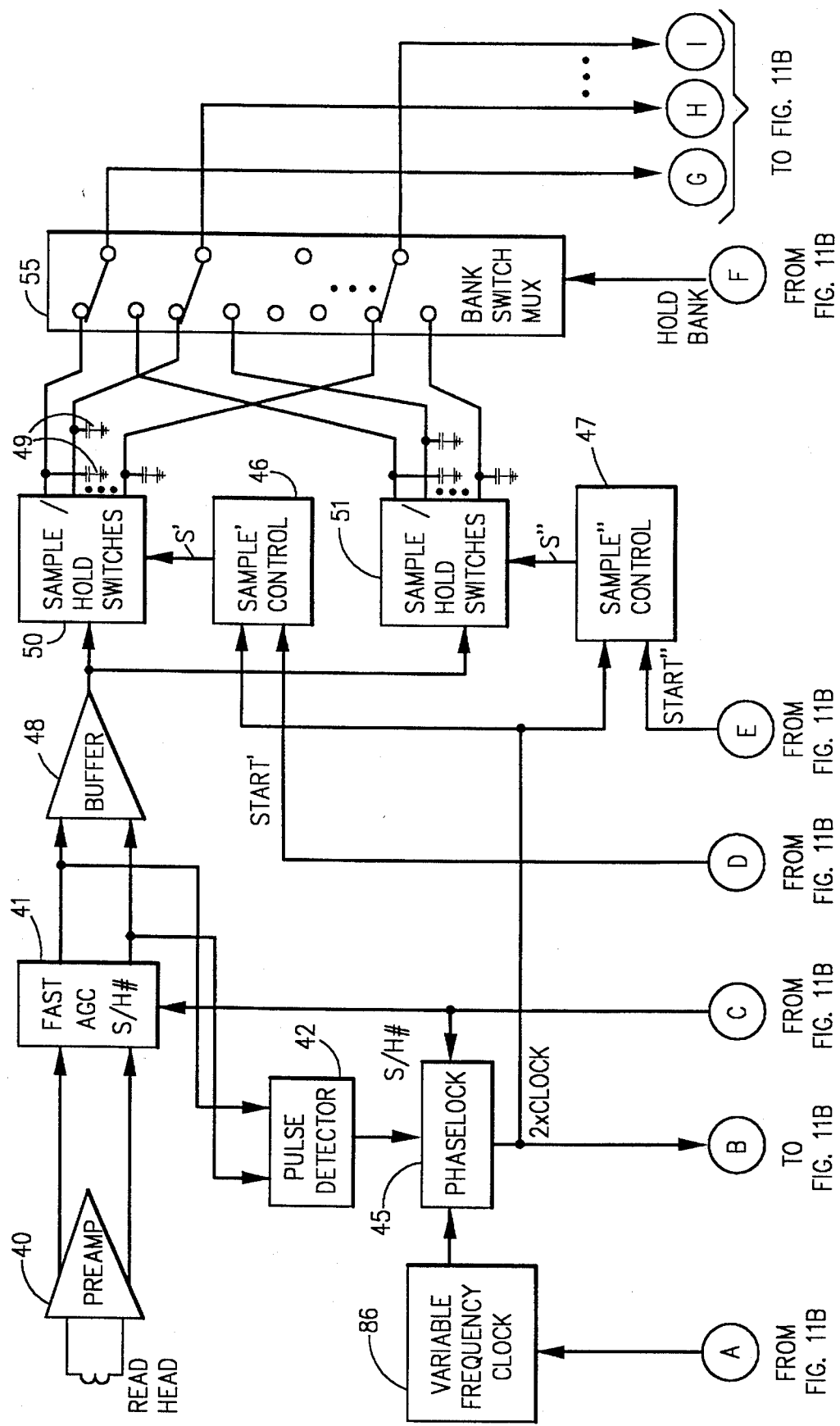
FIGS. 11A and 11B is a block diagram showing one specific implementation as an example of the present invention.

The operation of the invention will be described referring to FIGS. 11 and 12. The read head signal is amplified by the preamp 40 and fed to a fast AGC amplifier 41 and a pulse detector 42 on the block diagram of FIG. 11A. Each data sector on the disk is divided into a number of subsectors, each preceded by a resynchronizing gap, as shown in FIG. 12.

The AGC amplifier 41 is designed to quickly acquire the level of the signal during the resynchronizing gaps and hold the acquired value of gain during the subsector. In accordance with one aspect of the invention, it quickly (within a few cycles) measures the signal amplitude and adjusts it. It is necessary to adjust the amplitude so as to present the same amplitude to the neural network because the neural network's neuron outputs will depend on the amplitudes of their inputs. The S/H# signal from the sequencer 44 controls whether the AGC amplifier is acquiring or holding the gain necessary to produce the correctly scaled output. (As used herein, # and overbar ¯ are used to denote logical inversion).

Also, during the gaps, the phase locked loop 45 will adjust the phase of its oscillator to match that of the data. This is necessary to insure that the network will be sampling the subsectors with the same phase each time in order to make the patterns it sees as repeatable as possible. The same S/H# signal used for the AGC amplifier is used for the phase locked loop. During the sample time, it will acquire the phase of the signal and during the hold time, it will hold that value of phase for the duration of the subsector.

The output of the phase locked loop is used, via the sample control blocks 46 and 47 to sample the AGC's signal as it comes out of a differential-to-single ended buffer 48. The buffer provides enough current to quickly charge the sampling capacitors 49. The sample/hold switches 50 and 51 are analog switches that sequentially charge each capacitor by briefly closing a switch. This provides a group of charged capacitors, each representing the voltage at the time it was charged by a momentary contact through an analog switch. The timing of the charging of these capacitors is determined by the sample control blocks 46 and 47. These blocks are shift registers, whose clock is the clock whose phase is held by the S/H# signal.

There are two such circuits, which are needed for the following reason. The operation of the ETANN is such that the inputs that it is presented with must not change while it is doing its pattern recognition task. However, new data must be brought to the system all the time. If it were to sit idle while the present data was processed, time would be wasted. Therefore, there are two sample/hold switches 50 and 51 and their respective controllers 46 and 47. While one is presenting and holding one subsector of data to the ETANN inputs, the other is gathering the next subsector data. In this way, the next subsector samples can be immediately presented without delay.

As can be seen from FIG. 12, the pulses Start' and Start" that start the acquisition at the sample/hold 50 and the sample/hold 51 come at alternating subsectors.

Also at alternating subsectors the signal Hold Bank alternates polarity, from 0 to 1 and back. The purpose of this signal is to switch the bank switch MUX 55 between sample/hold bank and the other.

RESETi, RESETf and CLK drive the ETANN 56 to implement a two-layer, 64 input neural network as described in the ETANN Operation section above. As seen in FIG. 12, the outputs of the neurons, N0–N63 are occurring a time tIVQV after the toggling of the RESETi and RESETf lines. (tIVQV is 1.5 microsecond, maximum.) Note that during OUTPUT 2, the current subsector decode is complete; during OUTPUT 1 on the N0–N63 lines, only the output of the first layer occurs.

The OR gates 57 at the N0–N63 outputs are there for the following reason. Any one subsector may be of a positive polarity or of a negative polarity, depending on whether the number of pulses in the previous subsector was odd or even. This is because in digital magnetic recording two consecutive pulses of the same polarity do not occur. Because the ETANN can only detect positive dot products, it is necessary to use one half of the neurons to detect one polarity and the other half the opposite. N0–N31 detect one polarity and N32–N63 detect the other. However, it does not matter what the polarity is. The two groups of neurons are OR'd to provide a single output for either polarity.

Figure 11B:
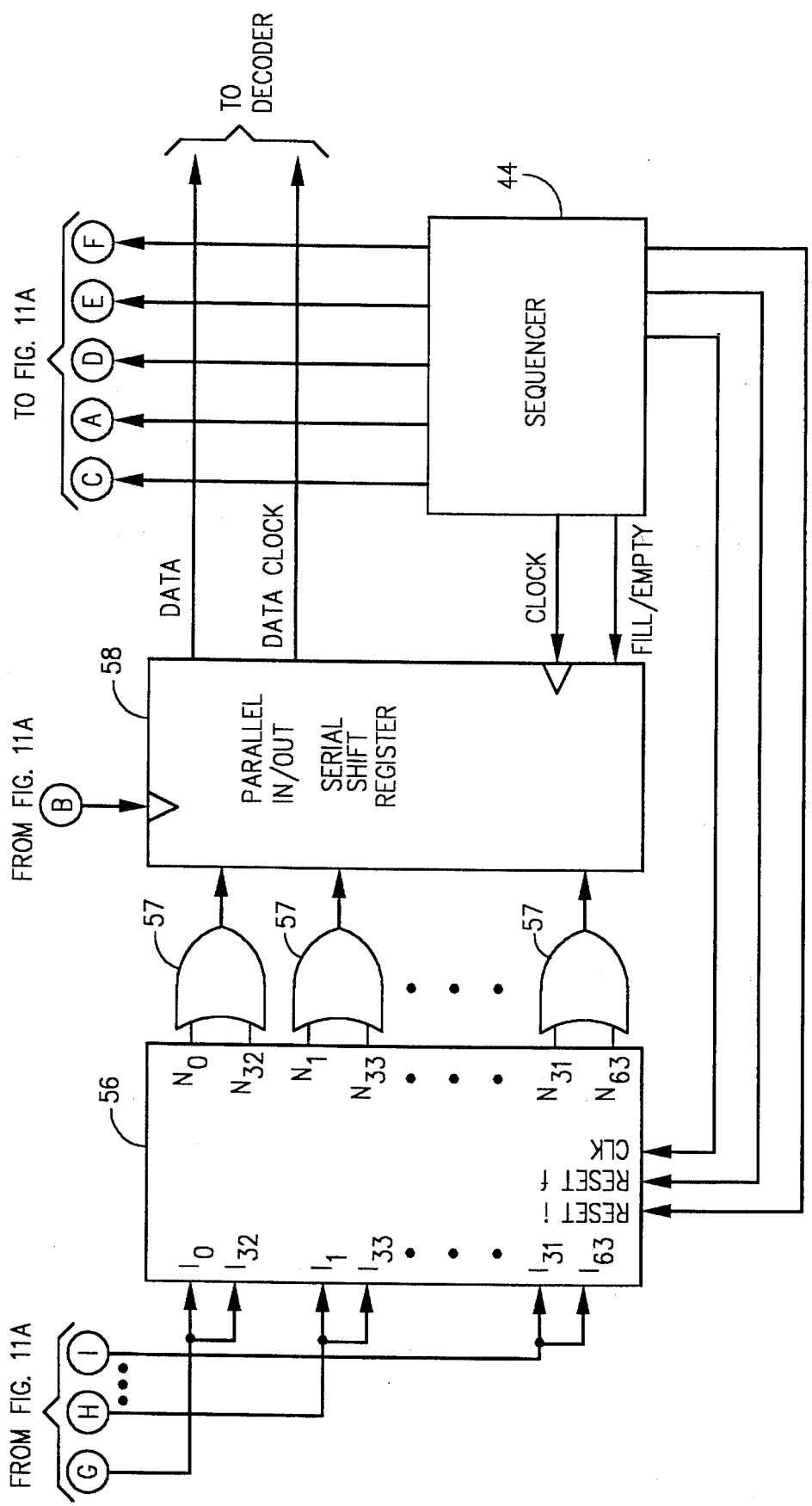
Figure 12:
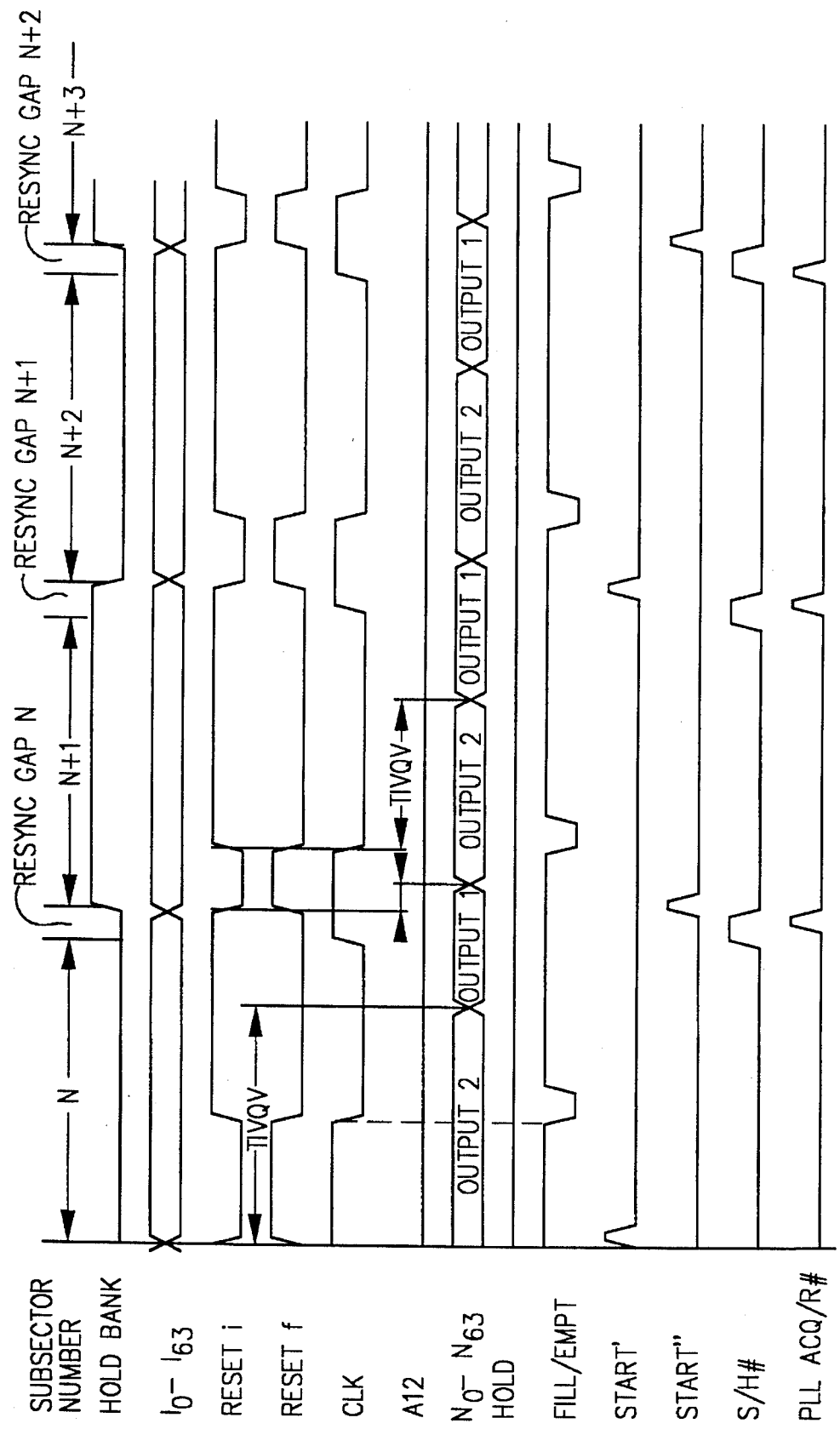
FIG. 12 depicts waveforms during the operation of the circuit of FIG. 11.

The OR gate outputs feed the parallel in serial out shift register 58 (FIG. 11B). This shift register is loaded (in parallel) during the low level of the FILL#/EMPTY signal. During the high level, it is shifted out (in Serial) by the CLOCK signal from the sequencer 44. The format of the data is the same as that originally recorded.

The output of the parallel in/serial out shift register 58 is in a form similar to that of present channel designs; therefore, it is handled in the same way, i.e., by decoding it in decoder 21 (FIG. 1).

The sequencer 44 can be the drive's main processor or one dedicated to the operation of the neural network channel. It is programmed to time the operation of the various neural network channel signals.

Because the neural network is trained to recognize only a fixed set of input patterns, it is necessary to define what those patterns are. This is shown in FIG. 13. FIG. 13 is only an illustrative example. The data patterns were selected to be of a low density so as to allow for the highest packing density of the bit cells close to one another. The 32 patterns shown are encoded from 5 host bits (2 to the 5th power is 32) and represent all possible combination of 1's and 0's in 5 host bits. For example, the pattern #0 from the host computer 10 is encoded by encoder 14 (FIG. 1) as a "1" in bit cell 7 of the subsector with the rest of the bit cell being 0. Pattern #1 is encoded as a "1" in bit cell 8, . . . and pattern #3 is encoded as a "1" in bit cells 2, 6, A and B with the rest of the bit cells being 0. This mapping is likely not the most efficient, but it illustrates the general technique that would apply here. That is, one would select 32 different bit patterns that the network would be expected to recognize reliably. These 32 patterns represent all combinations of bits in 5 bit segments in the data stream from host computer 10.

BRIEF EXPLANATION OF THE CIRCUITRY

Specific circuits and how they work are described below.

Preamp 40

The Preamp is a typical disk drive read preamp, such as the SSI 117 preamp. This is an off-the-shelf item and needs no explanation.

Figure 14:
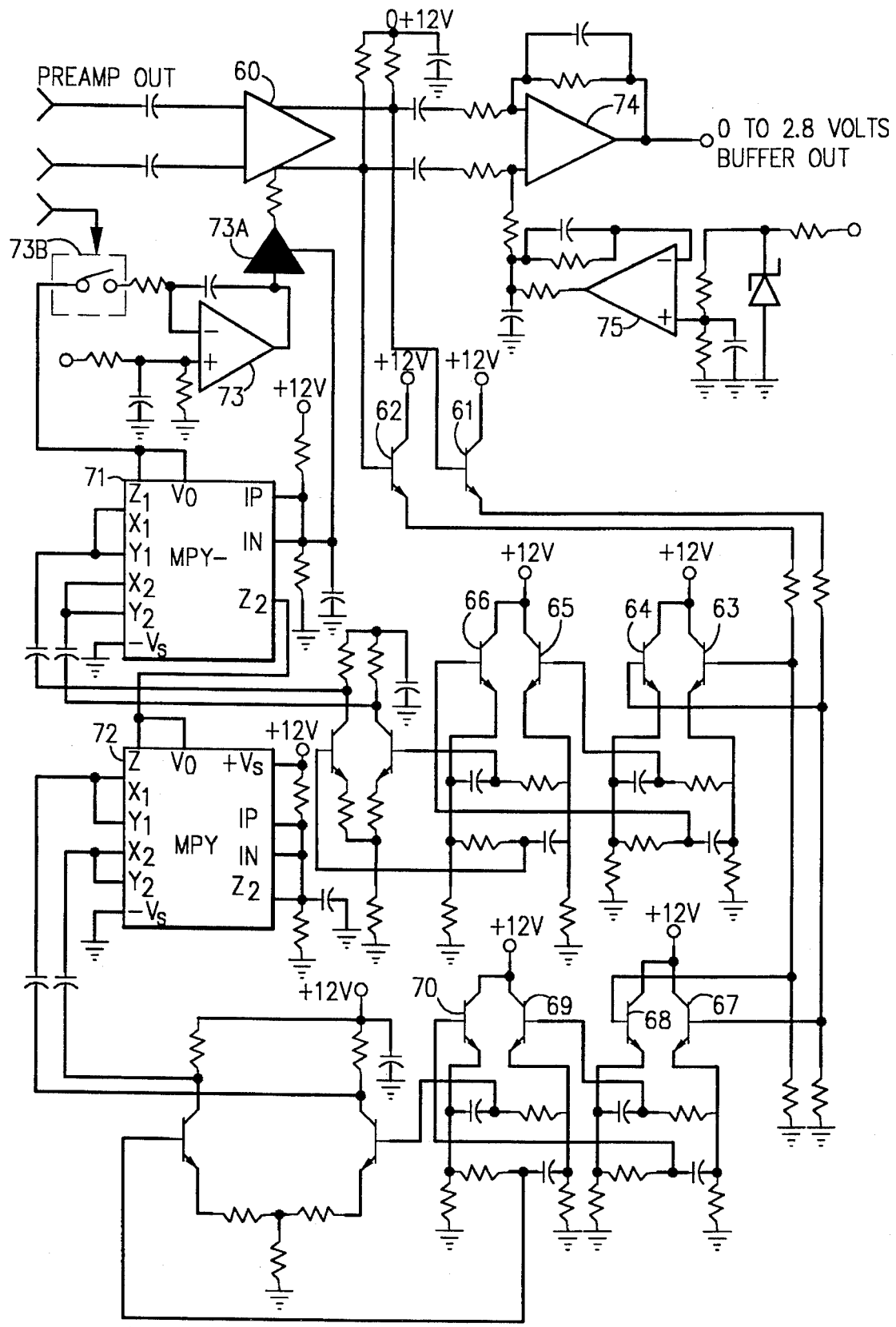
FIG. 14 is a schematic diagram of the AGC amplifier and buffer.

Fast AGC Amplifier 41, FIG. 14

As explained above, the AGC amplifier 41 must be fast in order to get to the right gain in a hurry. This is done in order to avoid wasting space on the disk to allow for adjustment to a known amplitude "gap" signal. It is necessary because on constant density recording, the tracks with the largest radius will have a larger amplitude signal than those in the inside radii. Because the sigmoid functions are somewhat level dependent, it becomes necessary to consistently level the signal.

The AGC is made fast by a 90° phase shift network. The principle is as follows. Given an input of the form:

$$A(t)\cos(\Omega t+\theta)$$

upon passing through the 90° phase shift network, there will be 2 outputs:

$A(t)\cos(\Omega t)$ and $A(t)\sin(\Omega t)$

Squaring these two and adding them gives:

$A(t)^2\cos^2(\Omega t)+A(t)^2\sin^2(\Omega t)=A(t)^2(\sin^2(\Omega t)+\cos^2(\Omega t))=A(t)^2$ Thus, an instantaneous measurement of the amplitude (in this case, squared) is obtained. All that is necessary is that the bandwidth over which the 90° phase shift work has the prior 90° phase shift sufficiently covers the bandwidth of the envelope of the input signal that is to be leveled.

Referring to FIG. 14, the variable gain AGC amplifier component 60 is a Motorola MC1590. Its output is sampled and buffered by two NPN transistors, 61 and 62. These transistors drive a group of 8 NPN transistors 63–70 which, with their emitter R-C networks, comprise the 90° phase shift network. More stages of this type may be needed, depending on the bandwidth of the signal envelope variation encountered. These are followed by two Burr-Brown MPY 600 multipliers 71 and 72 configured so as to square their input signals. The outputs of these squaring circuits are combined (added) in the MPY 71. Per the above equation, the output of MPY 71 is the $A(t)^2$ or the square of the amplitude that is desired. The fact that it is squared will cause the loop to adjust faster for signals that are too large and slower for ones that are too small. If this is unacceptable, then a third MPY 600 could be added before the input of the integrator operational amplifier 73. Amplifier 73 will servo the amplifier 60 with inverter 73A to the level present at the non-inverting (+) input of amplifier 73. Amplifier 73 is an analog inverter with gain=1. The gain is held constant if the analog switch 73B is opened via the S/H# signal.

Buffer 48

The buffer 48 (FIG. 11) is shown also in FIG. 14. It comprises a Burr-Brown BB3554 operational amplifier 74, chosen for its ability to drive capacitive loads (such as the sampling capacitors) quickly without oscillating. Also, it performs the differential-to-single ended conversion function. The zero signal analog reference voltage is set to be 1.4 VDC by the operational amplifier 75 and an LM336-2.5 voltage reference (zener symbol).

Figure 15:
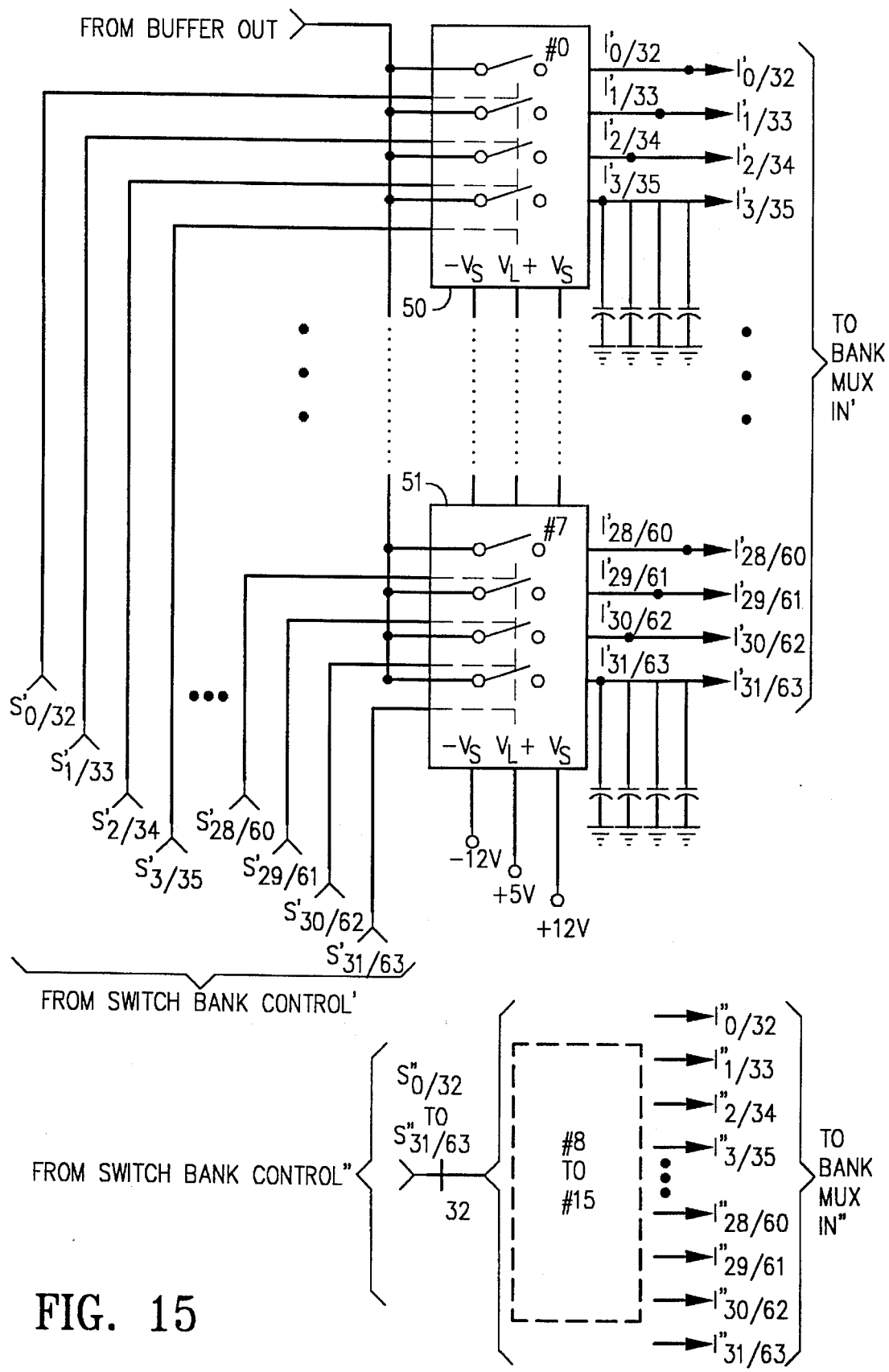
FIG. 15 shows the analog sample and hold switchbank.

Sample/Hold Switches 50 and 51, FIG. 15

The sample/hold switches are two groups of 8 each of MAXIM IH5352 RF analog switches. They have switching times of 300 nS max, which limits the upper range of operation, this limit is about 3 million samples per second, enough for a floppy drive. A faster switch would allow operation up to 10 million samples per second.

As explained above, the group 50 will be gathering data while the group 51 is holding the present data during one polarity of the HOLD BANK signal. The group functions will swap during the other polarity of the HOLD BANK signal.

Figure 16:
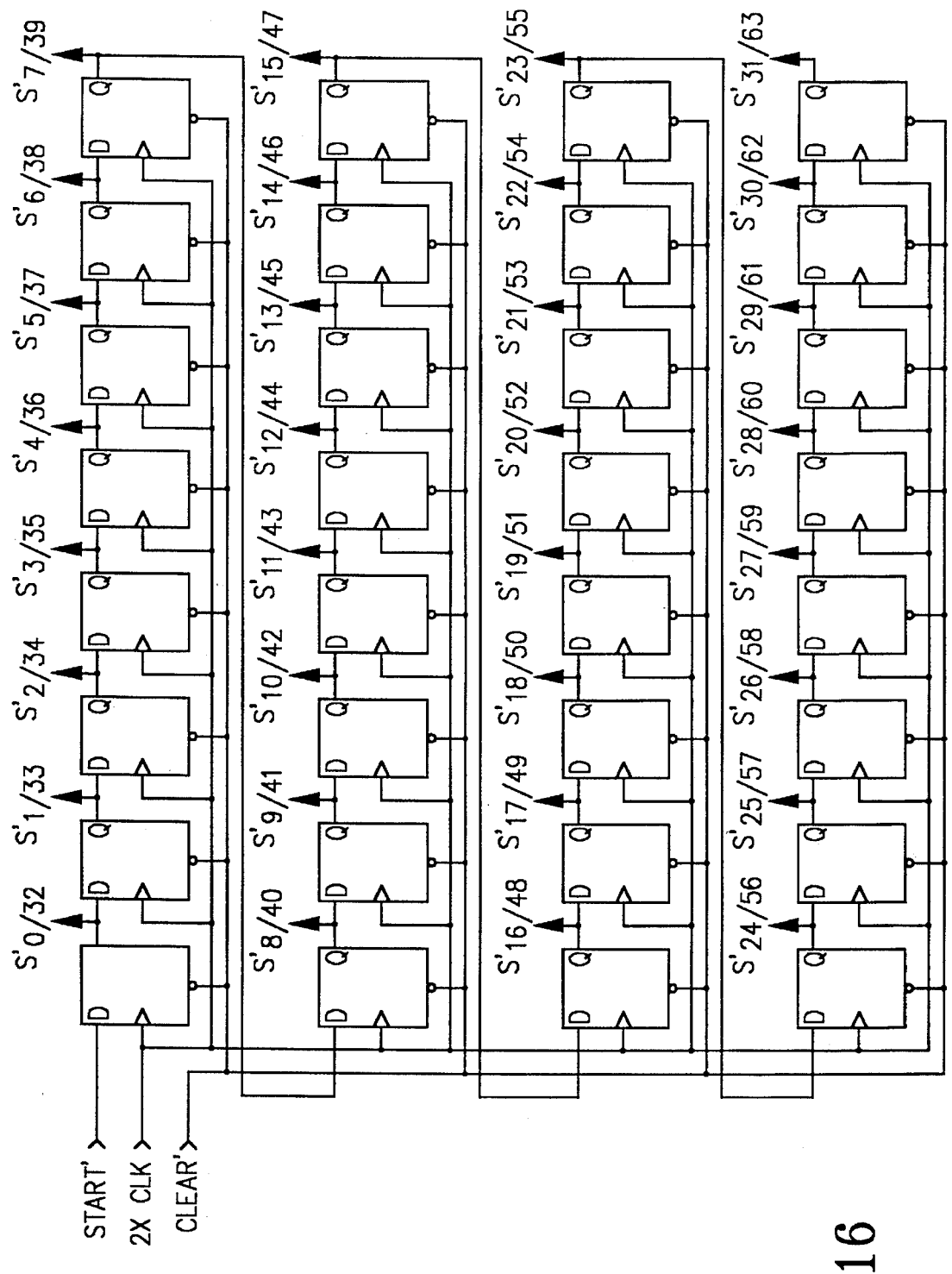
FIG. 16 shows one of the two switchbank control's schematic.
Figure 17:
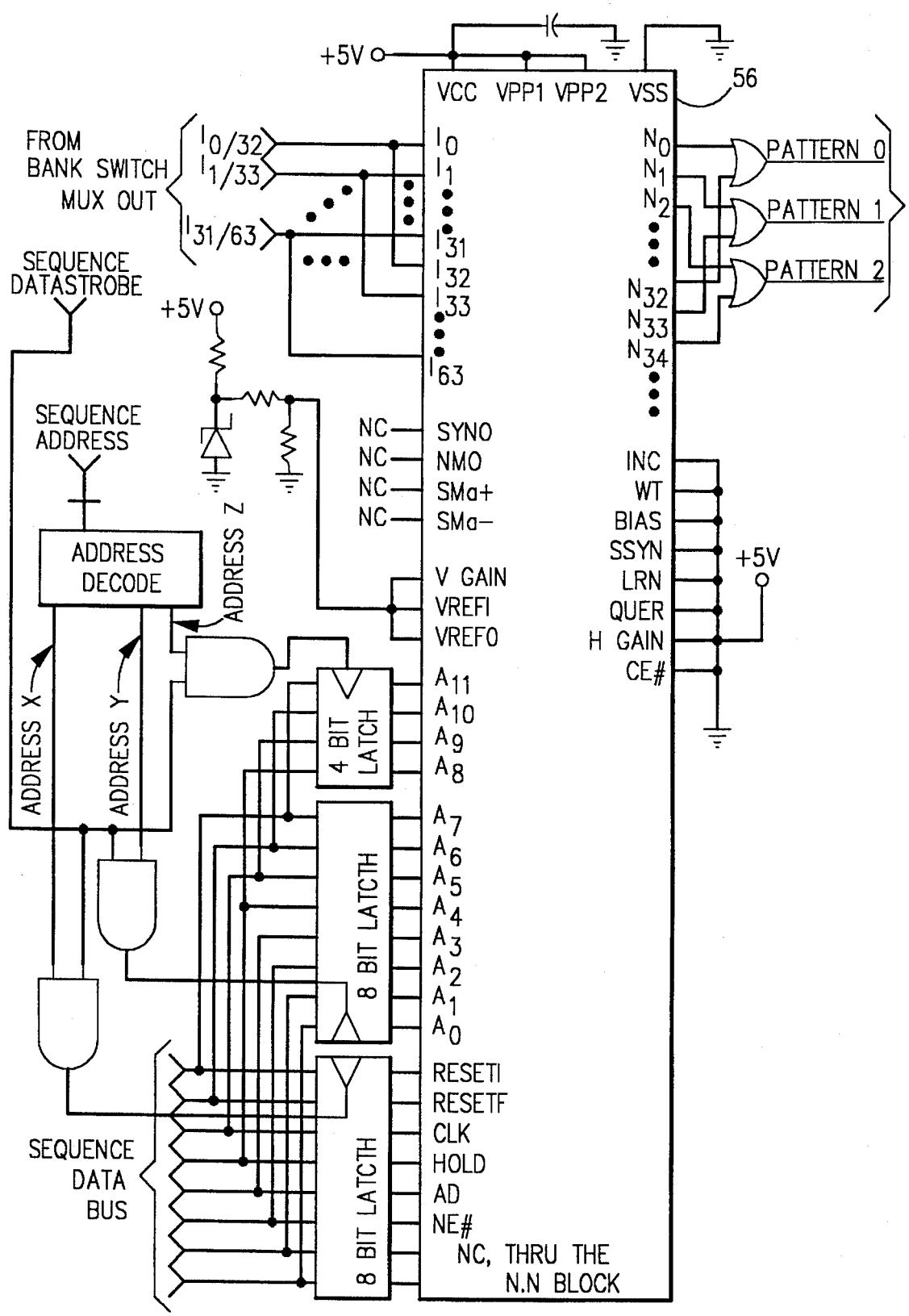
FIG. 17 shows the connections to the ETANN device.

Sample Control 46 and 47, FIG. 16

FIG. 16 details the sample control circuits 46 and 47. Note that the figure only shows the circuit 46. The circuit 47 is identical except that it is driven by the "Start" signal, rather than by the "Start" signal. It is a 32-bit shift register that is clocked by the 2XCLK signal from the phase locked loop 45 (FIG. 11). It is keyed off the phase locked loop so as to have the same phase each time for each pattern. The phase locked loop phase is held constant and not updated during the subsector time.

The Start' and Start" pulses come from the sequencer 44 (FIG. 11) and are timed to start at the beginning of each subsector.

Bank Switch MUX 55 (FIG. 11)

The bank switch multiplexer 55 is a group of 16 MAXIM DG307ACJ's. It performs the function of selecting between the sample/hold's that are filling or holding, as determined by the HOLD BANK signal. The output of this MUX goes directly to the ETANN inputs.

ETANN 56, FIG. 17

The ETANN circuit 56 is an Intel 80170NX. It has latches 70 for its inputs that are accessed via address decoder 71. The latches are used to hold signals from the sequencer data bus 72. These signals control the ETANN, such as RESETi, RESETf, CLK, etc., as described in ETANN Operation, above.

The weight programming pins, such as INC, WT, SSYN, etc., are tied to a fixed logic level. They are used to program the weights (synapses) at the factory, and remain fixed throughout the life of the product. With the Bake-Retraining method of weight setting, the weights will stay accurate to better than 6 bits over 10 years.

The ETANN uses no clocks, as it is an analog part. Because either positive or negative patterns of the same shape, but opposite polarity must be decoded, the ETANN is divided up into two 32 bit halves, identical except they must decode opposite polarity signals. Because either polarity is valid, the two polarities are OR'd with a set of 8 74HC32 quad OR gates 57.

Figure 18:
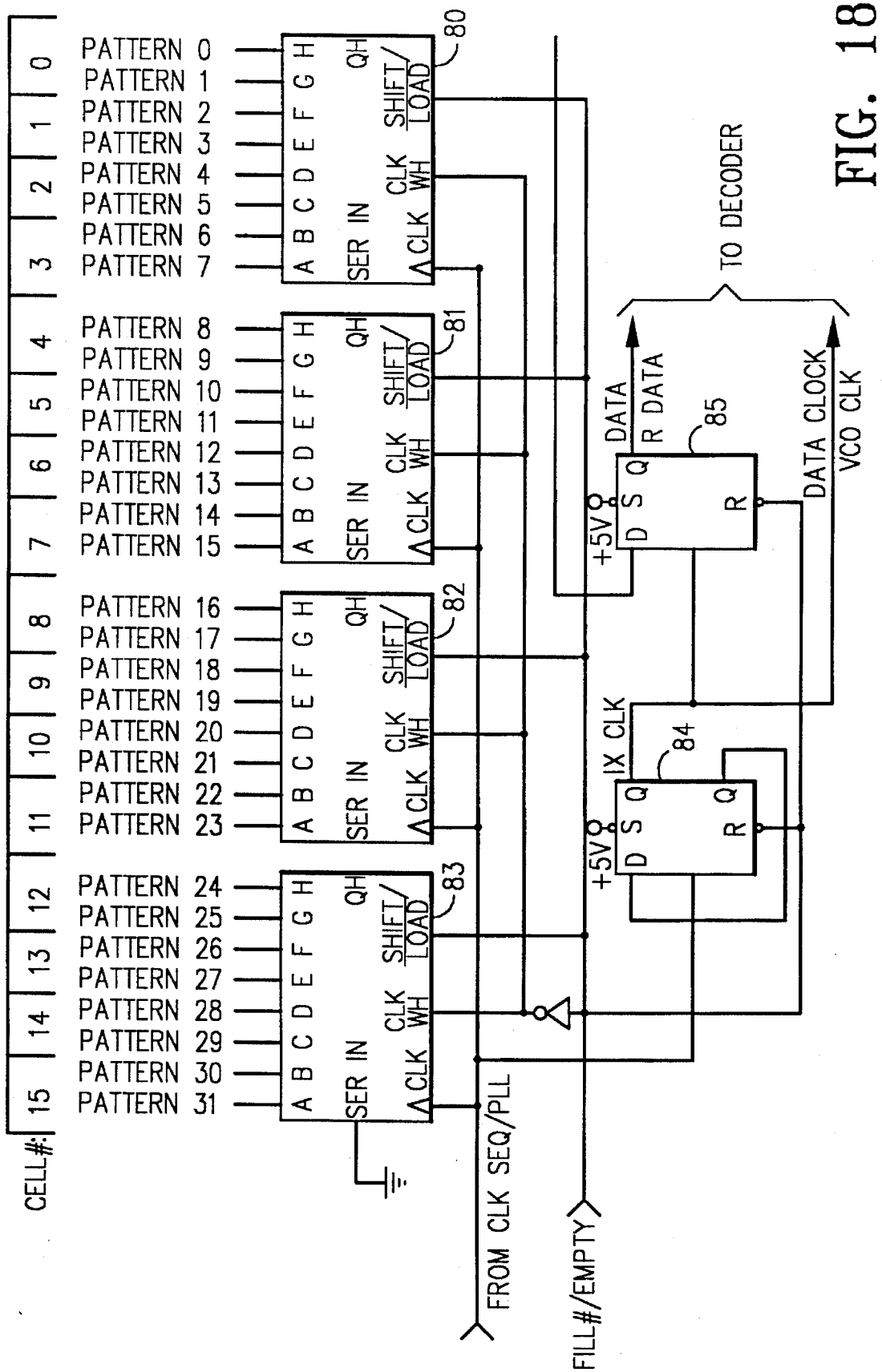
FIG. 18 shows the pattern reconstructor schematic.

Parallel In/Serial Out Shift Register 48, FIG. 18

This is for one implementation wherein a distinct output pattern (comprising pattern 0-pattern 31 bits) is generated for each input pattern. The output pattern is the network's output, trained to match the originally encoded data.

This circuit has 4 74HC165 Parallel In/Serial OUT shift registers 80–83. The FILL#/EMPTY signal that happens once per subsector determines whether the load or shift function is performed. It is clocked by the CLOCK signal from the sequencer 44. Because there are 2 samples per bit cell, this CLOCK signal is at a frequency of 2 times the DATA CLOCK that the following decoder needs. The purpose of the 74HC74 denoted 84, is to do the required divide by 2 and the 74HC74 denoted 85 is used to synchronize clock and data.

Pulse Detector 42/Phase Locked Loop 45 (FIG. 11A)

This is an off the shelf combination or separate disk drive pulse detector and phase locked loop. Its purpose is to reset the phase locked loop phase at the beginning of a sector or at subsector boundaries. However, it is necessary that the phase locked loop have a hold feature for the phase so that phase can be held constant during the subsector data. This helps to sample each subsection at the same time and phase, to minimize the pattern variation presented to the ETANN. Furthermore, because constant density recording must be used, this phase locked loop must be able to handle different zone frequencies. This is shown in FIG. 11, only as a general block, because this is an off-the-shelf component.

Variable Frequency Clock 86 (FIG. 11A)

Because there are different frequencies in the different zones, the reference frequency input to the phase locked loop needs to be different for the different zones. This is the reason for the variable frequency clock 86 in FIG. 11. It selects a zone frequency under command of the sequencer.

Sequencer 44

The sequencer is either the disk drive's controller processor or a separate unit dedicated to the control of the ETANN-based read channel.

Input Waveforms

Figure 19:
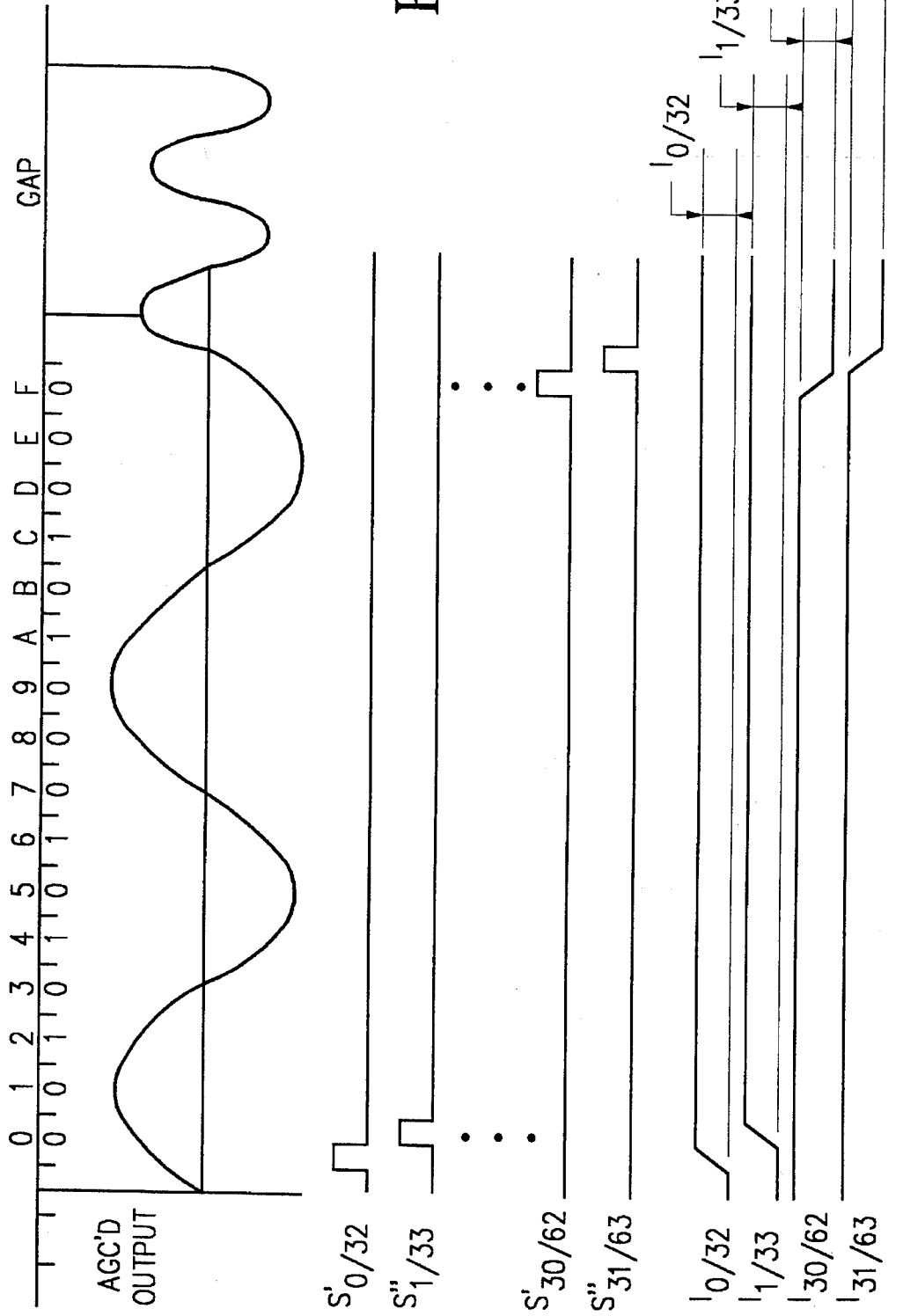
FIG. 19 shows waveforms developed in the circuit of FIG. 18.

The relative timing of the sample/hold and analog input waveforms is shown in FIG. 19. This shows how the sample/holds are timed.

Alternate Implementation

The previously described neuron implementation involves the use of two layers of 32 neurons. (There are 64 neurons in each layer. 32 are used in each layer for positive patterns and 32 for their negative mirror images). It hypothetically requires the network to train to distinguish 32 separate patterns with its two layers. More than two layers are likely necessary. This can be done by adding ETANNs.

Figure 20:
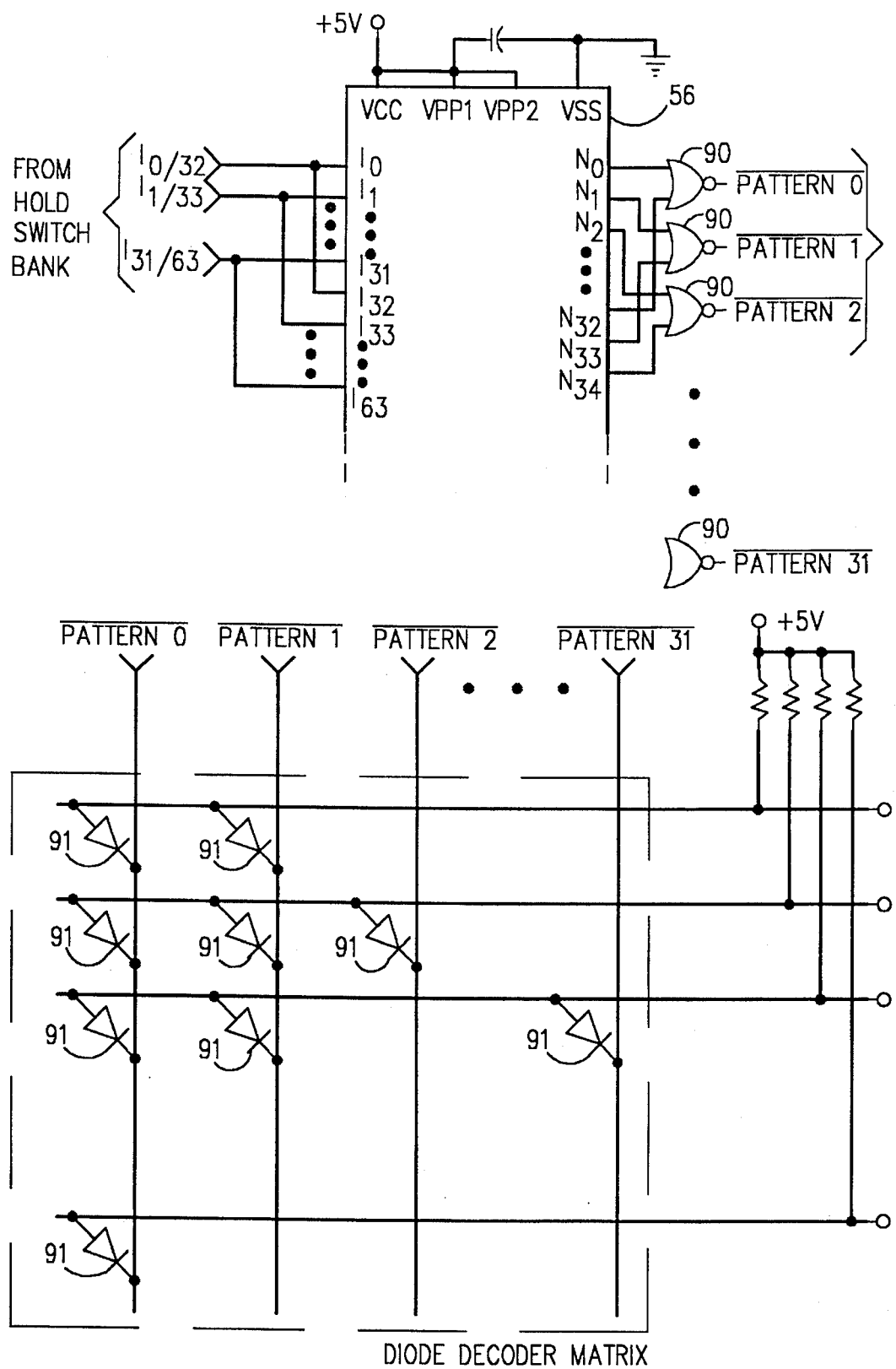
FIG. 20 shows an alternate embodiment of the invention.

Another implementation is possible. Rather than training the network to reconstruct thirty-two 32 bit patterns on its outputs, the network is trained to cause one, and only one, of its 32 NOR'd outputs to go LOW (logical 0) for each of the 32 possible input patterns. FIG. 20 shows a circuit implementation that produces a desired output pattern from one and only one of the "PATTERN N" lines of FIG. 18. In the FIG. 20 the outputs of the neurons are combined in 74HC02 NOR gates 90. The outputs of NOR gates 90 drive the nodes, which have crosspoint diodes 91 in the decoder matrix, low from the +5 V applied through resistors 92. The diodes can be placed to re-invert the signal. (In this case, they would have been pulled high from ground by OR gates but with a different, complementary, diode matrix). The outputs of the diode matrix connects to the parallel inputs of the Parallel IN/Serial OUT Pattern Reconstructor, of FIG. 18. In this implementation, these parallel inputs would not be called Pattern N. This is because Pattern N is defined differently at a different point.

Figure 21:
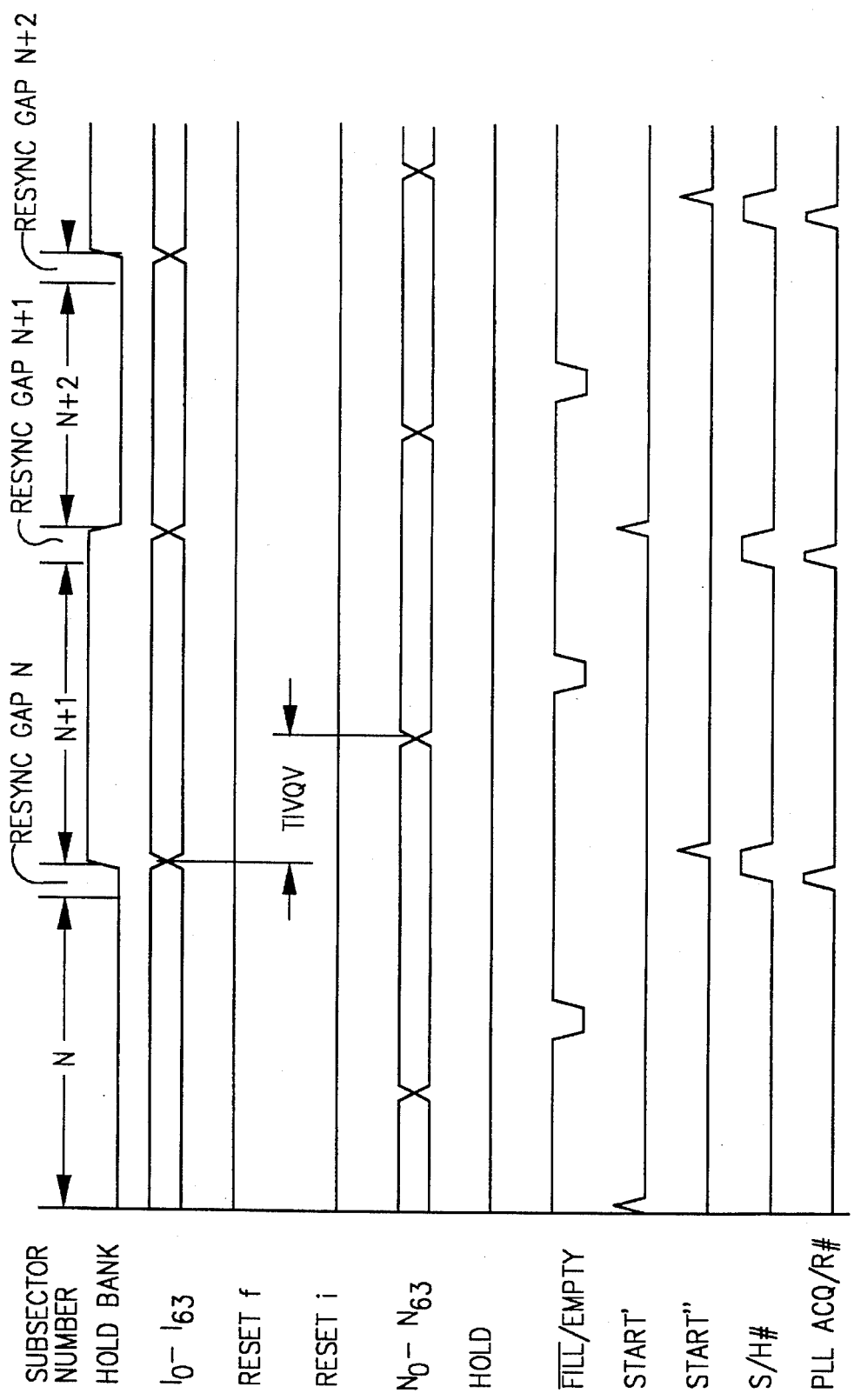
FIG. 21 shows waveforms developed in the operation of the circuit of FIG. 20.

This neural network could be implemented as a 2-layer network, in which case the rest of the circuit as well as the timings of FIG. 12 would remain the same. The advantage of using two layers is that the network is more powerful in separating patterns, but has a propagation delay of as fast as two processing delays (a little over 3.0 uS) for each 32 sample pattern. It is possible to use one layer. In this case, the timing diagrams would be as in FIG. 21. Note that the inputs from each hold bank would merely be presented to the I0–I63 inputs and the correct PATTERN N output pin would go active (in this case LOW), generating the desired pattern via the diode matrix. The diode matrix output would be latched in parallel and then swept out serially via the Parallel IN/Serial OUT/Pattern Reconstructor, FIG. 20.

EXAMPLE

This example illustrates the functioning of the neural network for one of the 32 possible patterns proposed. The general operation of any other of the remaining patterns will be the same.

A particular input pattern is detected by having its corresponding neuron output being a "1" while the neuron outputs corresponding to other patterns have a "0" output. This example only shows the one layer method decoded with reference to the FIG. 20 embodiment. This is simpler to illustrate than the two layer implementation which requires a back propagation training session.

Figure 22:
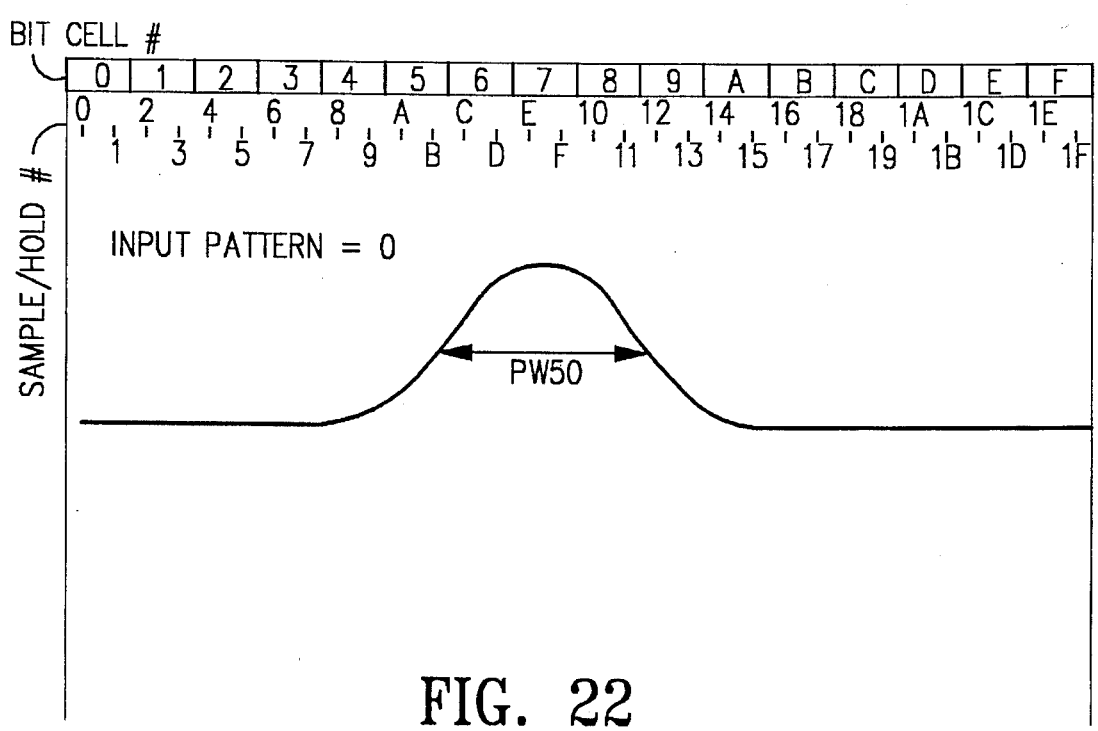
FIG. 22 is a waveform depicting one input pattern described in the example.

It is assumed that the pattern input is Pattern number 0. That is, the sample/holds have captured the waveform in FIG. 21. In FIG. 22, the small "x's" represent the voltage sitting on the sample/hold number corresponding directly over each "x". The continuous voltage trace represents the continuous voltage that was sampled by each sample hold at each "x" shown. The voltages present at the "x's" are fed into the I0–I63 inputs, one sample/hold to two inputs for detecting either polarity pattern. Only one polarity is shown here for brevity. It is assumed that the drive is in the read mode and that all "housekeeping"-type control signals, such as subsector PLL bursts, servo pulses, sample/hold bank switching, etc., are in place.

FIG. 22 shows the time span of the pulse at its 50% (of peak) amplitude points to be greater than 3 bit cells. This represents a modest density increase. The pulses could be made even wider relative to bit cells for a further density increase, but the present density was chosen to help illustrate the principle of operation.

Figure 23:
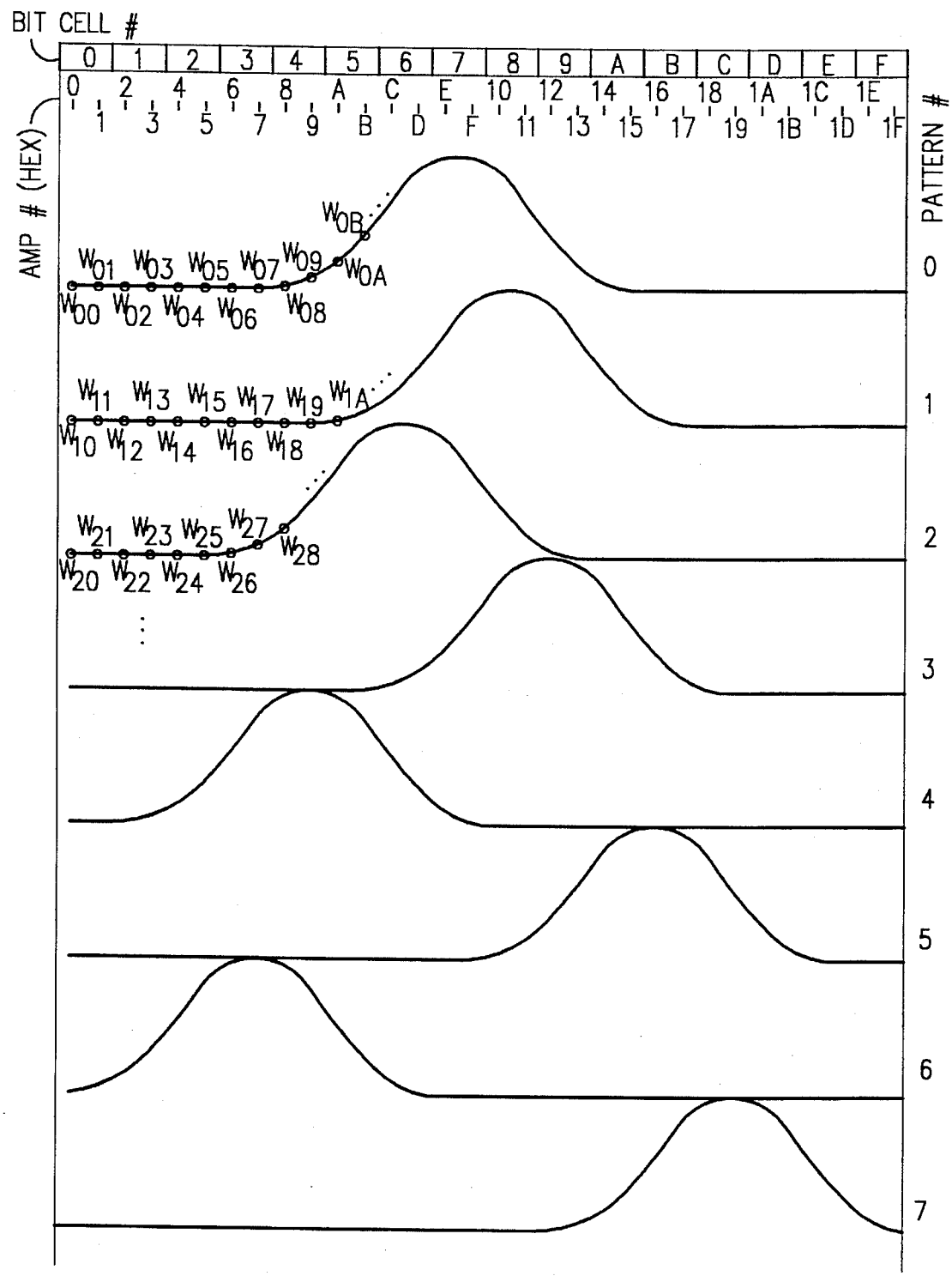
FIGS. 23 and 24 show the stored weights for patterns 0–9 in the example.
Figure 24:
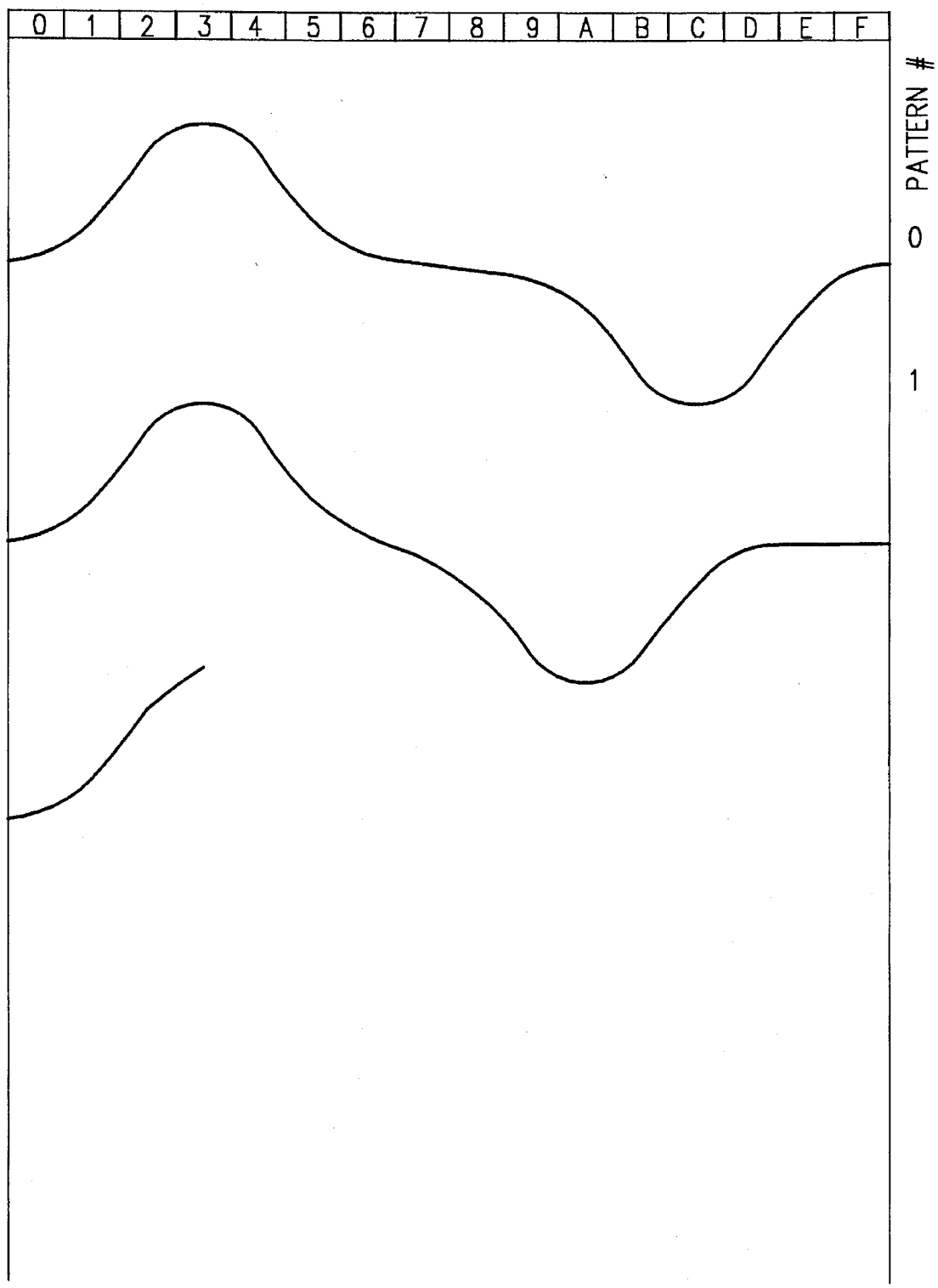

FIGS. 23 and 24 show the stored weights for patterns 0 through 9 of one polarity. Actually, there are 32 patterns of each of the two polarities for a total of 64 stored weight patterns. What is shown for the first 10 patterns can be generalized to the rest of the stored pattern weights that are here omitted.

In FIG. 23, the small circles around the tick marks correspond to a weight (synapse) value shown. Each tick mark is a weight associated with the SAMP(le) shown at the top, with the first few circled to emphasize that they are weight values. Circle and weight numbers are not shown for all weights. The continuous line through the weights shows the analog waveform that the weight template corresponds to. Another way to view this is that the values at the tick marks (circled or not) are the sample values that will be stored and compared with the input waveform to determine which pattern the input waveform represents. The weights are labeled as Wij, where the index "i" tells which neuron and the index "j" tells which input are being connected with synapse weight value Wij. Each input pattern will correspond to one and only one neuron output, and each neuron output will be driven by the 32 weights that feed it.

Each weight value can range about −14 uA/V to +14 uA/V, from FIG. 12 of the ETANN application note. Also, an input range of q1.4 volts, centered around 1.4 volts DC is assumed. Accordingly, the weights for pattern 0 which will come out neuron 0 are from FIG. 23.

While a particular embodiment has been shown and described, various modifications of the invention are within the spirit and scope of the invention. The appended claims are, therefore, intended to cover all such modifications.

What is claimed is:

1. A magnetic data recording system in which patterns of data bits are recorded and reproduced comprising:

a magnetic disk for storing said patterns of data bits;

means for recording said patterns of data bits on said recording medium;

a read channel;

means for reproducing a pattern of data bits from said recording medium;

the reproduced pattern of data bits being applied to said read channel to produce a read signal;

a rapidly setting automatic gain control amplifier which produces an instantaneous output representing the read signal squared; and an electronically trainable neural network, the reproduced patterns of data bits from said read channel being applied to said neural network, said neural network being trained to produce an output representing the pattern of data bits which was recorded from the pattern of data bits which was reproduced from said magnetic medium.

2. The system recited in claim 1 wherein said read signal is of the form $A(t)\cos(\Omega t+\theta)$ and wherein said rapidly setting automatic gain control amplifier comprises:

a 90° phase shift network, said signal being applied to the input to produce two outputs $A(t)\cos(\Omega t)$ and $A(t)\sin(\Omega t)$; and means for squaring and adding these to produce an output represented by:

$$A(t)^2\cos^2(\Omega t)+A(t)^2\sin^2(\Omega t)=A(t)^2(\sin^2(\Omega t)+\cos^2(\Omega t))=A(t)^2$$

wherein A is a constant, t represents time, and $\Omega$ is a multiplier of time.

3. The system recited in claim 1, wherein an a priori known training sequence is stored on said magnetic recording medium, and wherein the error between what was actually read and said known sequence is the error used to train said network.

4. The system recited in claim 1 adapted for connection to a host computer which generates a data stream to be recorded upon and reproduced from said magnetic storage medium, said system further comprising:

an encoder for encoding said data stream into a fixed number of bit patterns to be recorded; and a decoder for converting said output from said neural network to a data stream to be sent to said host computer;

said data encoder producing a limited number of different bit patterns, said neural network having weights which produce an output which reliably recognizes the limited number of patterns after distortion by recording and reproduction from said magnetic medium at increased density.

5. The system recited in claim 4 further comprising:

means for sampling the output of said read/write head to produce an output represented by sample 1, sample 2, . . . sample N, and wherein said weights are denoted weight 1, weight 2, . . . weight N, said samples and said weights being applied to said electronically trainable neural network, said network producing an output represented by:

$$(\text{sample } 1)*(\text{weight } 1)+ \ldots +(\text{sample } 32)* (\text{weight } 32)=S \cdot W.$$

6. The system recited in claim 5 wherein said magnetic disk has data storage sectors and wherein said sampling means comprises:

first and second sample and hold circuits, said sample and hold circuits being connected to sample the read signal from alternate subsectors of said magnetic disk, the sampled outputs from one sample and hold circuit being applied to said neural network while the other of said sample and hold circuits is sampling the output of said read/write head.

7. The system recited in claim 6 further comprising:

a parallel in/serial out shift register, the outputs of said neural network being periodically applied to said shift register, said outputs being shifted out in serial and applied to said decoder.

8. The system recited in claim 4 wherein said electronically trainable neural network produces a plurality of outputs representing trained responses to said inputs processed by two or more layers of neurons, said neural network trained to distinguish each of said limited number of bit patterns and producing outputs representing said bit patterns.

9. The system recited in claim 4 wherein said electronically trainable neural network has a plurality of outputs equal in number to the number of bit patterns to be recognized, said outputs being dot products between said input samples and weights, and wherein said network produces an output on one of said lines when a particular pattern is recognized; and a decoder matrix, said outputs being connected to said decoder matrix to produce a multiple bit output representing the bit pattern recognized.

10. The system recited in claim 9 further comprising:

a parallel in/serial out shift register, the outputs of said neural network being periodically applied to said shift register, said outputs being shifted out in serial and applied to said decoder.

11. The system recited in claim 1 wherein said electronically trainable neural network is pre-trained at the factory to produce an output representing the pattern of data bits which was recorded from the pattern of data bits which was reproduced from said magnetic medium.

12. The system recited in claim 1 wherein said electronically trainable neural network is trainable in said magnetic recording system for on-the-fly training of said network.

13. A magnetic disk system in which patterns of data bits are recorded and reproduced comprising:

a magnetic disk for storing said patterns of data bits;

means for recording said patterns of data bits on said magnetic disk;

a read channel;

means for reproducing a pattern of data bits from said magnetic disk;

the reproduced pattern of data bits being applied to said read channel to produce a read signal;

a neural network set with weights when said disk system is built to recognize a limited number of bit patterns regardless of noise or distortion reproduced by the recording and reproduction of said bit patterns;

the reproduced patterns of data bits from said read channel being applied to said neural network, said neural network being pre-trained at the factory to produce an output representing the pattern of data bits which was recorded from the pattern of data bits which was reproduced from said magnetic disk; and a host computer which generates a data stream to be recorded upon and reproduced from said magnetic storage medium:

an encoder for encoding said data stream into a fixed number of bit patterns to be recorded;

a decoder for converting said output from said neural network to a data stream to be sent to said host computer; and said data encoder producing a limited number of different bit patterns, said neural network having weights which produce an output which reliably recognizes the limited number of patterns after distortion by recording and reproduction from said magnetic medium at increased density.

14. A magnetic disk system in which patterns of data bits are recorded and reproduced comprising:

a magnetic disk for storing said patterns of data bits;

means for recording said patterns of data bits on said magnetic disk;

a read channel;

means for reproducing a pattern of data bits from said magnetic disk;

a neural network trainable in said magnetic disk system to recognize a limited number of bit patterns regardless of noise or distortion reproduced by the recording and reproduction of said bit patterns;

the reproduced patterns of data bits from said read channel being applied to said neural network, said neural network being trainable on the fly to produce an output representing the pattern of data bits which was recorded from the pattern of data bits which was reproduced from said magnetic disk; and a host computer which generates a data stream to be recorded upon and reproduced from said magnetic storage medium:

an encoder for encoding said data stream into a fixed number of bit patterns to be recorded;

a decoder for converting said output from said neural network to a data stream to be sent to said host computer; and said data encoder producing a limited number of different bit patterns, said neural network having weights which produce an output which reliably recognizes the limited number of patterns after distortion by recording and reproduction from said magnetic medium at increased density.

* * * * *